US009998866B2

(12) United States Patent
Natucci, Jr. et al.

(10) Patent No.: US 9,998,866 B2
(45) Date of Patent: Jun. 12, 2018

(54) DETECTING GEO-FENCE EVENTS USING VARYING CONFIDENCE LEVELS

(71) Applicant: Microsoft Technology Licensing, LLC, Redmond, WA (US)

(72) Inventors: Lanny D. Natucci, Jr., Tacoma, WA (US); Janet L Schneider, Bellevue, WA (US); Mark A. Inderhees, Woodinville, WA (US); Frank Gorgenyi, Bremerton, WA (US); Stuart J. Harper, Seattle, WA (US); Cristina del Amo Casado, Seattle, WA (US); Fernando Gonzalez, Bellevue, WA (US); Sanjib Saha, Sammamish, WA (US); Shaun C. Hedrick, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days. days.

(21) Appl. No.: 13/918,810

(22) Filed: Jun. 14, 2013

(65) Prior Publication Data

US 2014/0370910 A1    Dec. 18, 2014

(51) Int. Cl.
*H04W 4/02*     (2018.01)
(52) U.S. Cl.
CPC ........... *H04W 4/022* (2013.01); *H04W 4/021* (2013.01); *H04W 4/028* (2013.01)

(58) Field of Classification Search
CPC ... H04W 64/00; H04W 4/021; H04W 64/022; H04W 64/003; H04W 48/04; G01S 19/42; G01S 5/0263
(Continued)

(56) References Cited

U.S. PATENT DOCUMENTS

| 5,379,451 A | 1/1995 | Nakagoshi et al. |
| 5,883,598 A | 3/1999 | Parl et al. |

(Continued)

FOREIGN PATENT DOCUMENTS

| CN | 1984402 | 6/2007 |
| CN | 101112072 | 1/2008 |

(Continued)

OTHER PUBLICATIONS

"Final Office Action", U.S. Appl. No. 13/090,474, dated Nov. 21, 2013, 12 pages.

(Continued)

*Primary Examiner* — Thai Vu

(57) ABSTRACT

The location of a computing device is determined, and the location of an area of interest that is a geographic area referred to as a geo-fence is identified. The accuracy of the determined location of the computing device has an associated uncertainty, so the exact position of the computing device cannot typically be pinpointed. In light of this, the uncertainty associated with the determined location is evaluated relative to the size of the geo-fence in order to determine whether the computing device is inside the geo-fence or outside the geo-fence. Based on this determination, various actions can be taken if the user is entering the geo-fence, exiting the geo-fence, remaining in the geo-fence for at least a threshold amount of time, and so forth.

20 Claims, 11 Drawing Sheets

(58) Field of Classification Search
USPC .......... 455/404.2, 456.1, 456.2, 456.3, 574; 701/426, 434, 438; 702/426, 434, 438
See application file for complete search history.

(56) References Cited

U.S. PATENT DOCUMENTS

| | | | |
|---|---|---|---|
| 6,067,565 A | 5/2000 | Horvitz | |
| 6,085,226 A | 7/2000 | Horvitz | |
| 6,182,133 B1 | 1/2001 | Horvitz | |
| 6,282,578 B1 | 8/2001 | Aizono et al. | |
| 6,286,001 B1 | 9/2001 | Walker et al. | |
| 6,339,826 B2 | 1/2002 | Hayes et al. | |
| 6,405,033 B1 | 6/2002 | Kennedy et al. | |
| 6,446,069 B1 | 9/2002 | Yaung et al. | |
| 6,504,480 B1 | 1/2003 | Magnuson et al. | |
| 6,513,046 B1 | 1/2003 | Abbott, III et al. | |
| 6,519,530 B2 | 2/2003 | Crockett et al. | |
| 6,546,002 B1 | 4/2003 | Kim | |
| 6,549,768 B1 | 4/2003 | Fraccaroli | |
| 6,564,149 B2 | 5/2003 | Lai | |
| 6,650,189 B1 | 11/2003 | Romao | |
| 6,662,023 B1 | 12/2003 | Helle | |
| 6,678,508 B1 | 1/2004 | Koilpillai et al. | |
| 6,799,047 B1 | 9/2004 | Bahl et al. | |
| 6,847,892 B2 | 1/2005 | Zhou | |
| 6,920,455 B1 | 7/2005 | Weschler | |
| 6,941,134 B2 | 9/2005 | White | |
| 6,968,179 B1 | 11/2005 | De Vries | |
| 7,058,659 B2 | 6/2006 | Ryu | |
| 7,076,797 B2 | 7/2006 | Loveland | |
| 7,096,030 B2 | 8/2006 | Huomo | |
| 7,142,848 B2 | 11/2006 | Owen et al. | |
| 7,161,914 B2 | 1/2007 | Shoaib et al. | |
| 7,171,557 B2 | 1/2007 | Kallahalla et al. | |
| 7,212,613 B2 | 5/2007 | Kim et al. | |
| 7,222,360 B1 | 5/2007 | Miller | |
| 7,272,388 B2 | 9/2007 | Andrew et al. | |
| 7,274,925 B2 | 9/2007 | Chaar et al. | |
| 7,302,272 B2 | 11/2007 | Ackley | |
| 7,305,284 B2 | 12/2007 | Teshima et al. | |
| 7,308,255 B2 | 12/2007 | Loveland | |
| 7,321,774 B1 | 1/2008 | Lau et al. | |
| 7,346,921 B2 | 3/2008 | Murren et al. | |
| 7,359,713 B1 | 4/2008 | Tiwari | |
| 7,366,798 B2 | 4/2008 | Nordstrom et al. | |
| 7,408,506 B2 | 8/2008 | Miller | |
| 7,471,929 B2 | 12/2008 | Fujioka et al. | |
| 7,530,099 B2 | 5/2009 | Flurry et al. | |
| 7,561,063 B2 | 7/2009 | Eckhart | |
| 7,634,455 B1 | 12/2009 | Keene et al. | |
| 7,639,131 B2 | 12/2009 | Mock et al. | |
| 7,657,849 B2 | 2/2010 | Chaudhri et al. | |
| 7,668,830 B2 | 2/2010 | Hakala | |
| 7,680,882 B2 | 3/2010 | Tiu, Jr. et al. | |
| 7,714,778 B2 | 5/2010 | Dupray | |
| 7,796,944 B2 | 9/2010 | Eaton et al. | |
| 7,809,350 B2 | 10/2010 | Buckley et al. | |
| 7,818,412 B2 | 10/2010 | Krause et al. | |
| 7,869,792 B1 | 1/2011 | Zhou et al. | |
| 7,898,428 B2 | 3/2011 | Dietz et al. | |
| 7,958,562 B2 | 6/2011 | Gaucas | |
| 7,961,651 B2 | 6/2011 | Kim et al. | |
| 8,036,677 B2 | 10/2011 | Khan | |
| 8,046,839 B2 | 10/2011 | Lo | |
| 8,112,755 B2 | 2/2012 | Apacible et al. | |
| 8,144,920 B2 | 3/2012 | Kansai et al. | |
| 8,185,599 B2 | 5/2012 | Kansai et al. | |
| 8,244,272 B2 | 8/2012 | Morgan et al. | |
| 8,258,748 B2 | 9/2012 | Constien et al. | |
| 8,275,352 B2 | 9/2012 | Forstall et al. | |
| 8,311,730 B2 | 11/2012 | Neff | |
| 8,320,931 B2 | 11/2012 | Ward et al. | |
| 8,355,751 B2 | 1/2013 | Dietz et al. | |
| 8,385,039 B2 | 2/2013 | Rothkopf | |
| 8,437,779 B2 | 5/2013 | Phukan | |
| 8,549,657 B2 | 10/2013 | Karlson et al. | |
| 8,565,820 B2 | 10/2013 | Riemer et al. | |
| 8,626,136 B2 | 1/2014 | Ozzie et al. | |
| 8,657,743 B2 | 2/2014 | Rietzel et al. | |
| 8,706,172 B2 | 4/2014 | Priyantha et al. | |
| 8,751,582 B1 | 6/2014 | Behforooz et al. | |
| 8,826,013 B1 | 9/2014 | Kodukula et al. | |
| 8,874,162 B2 | 10/2014 | Schrader et al. | |
| 8,907,772 B1 | 12/2014 | Green et al. | |
| 8,918,119 B2 | 12/2014 | Kim et al. | |
| 9,019,077 B2 | 4/2015 | Hazzani | |
| 9,027,117 B2 | 5/2015 | Wilairat et al. | |
| 9,066,234 B2 | 6/2015 | Karlson et al. | |
| 9,189,252 B2 | 11/2015 | Chu et al. | |
| 9,230,076 B2 | 1/2016 | King et al. | |
| 9,420,432 B2 | 8/2016 | Matthews et al. | |
| 9,710,982 B2 | 7/2017 | Dolly et al. | |
| 9,820,231 B2 | 11/2017 | Gorgenyi et al. | |
| 2001/0005681 A1 | 6/2001 | Kim | |
| 2001/0039587 A1 | 11/2001 | Uhler et al. | |
| 2002/0026478 A1 | 2/2002 | Rodgers et al. | |
| 2002/0044149 A1 | 4/2002 | McCarthy et al. | |
| 2002/0160764 A1 | 10/2002 | Gorsuch | |
| 2002/0183056 A1 | 12/2002 | Lundblade et al. | |
| 2003/0003907 A1 | 1/2003 | Lai et al. | |
| 2003/0139192 A1 | 7/2003 | Chmaytelli et al. | |
| 2003/0154293 A1 | 8/2003 | Zmolek | |
| 2003/0187803 A1 | 10/2003 | Pitt | |
| 2004/0007916 A1 | 1/2004 | Awada et al. | |
| 2004/0015940 A1 | 1/2004 | Heisey et al. | |
| 2004/0039909 A1 | 2/2004 | Cheng | |
| 2004/0166878 A1 | 8/2004 | Erskine et al. | |
| 2004/0192352 A1 | 9/2004 | Vallstrom et al. | |
| 2004/0193813 A1 | 9/2004 | Nguyen et al. | |
| 2004/0203576 A1 | 10/2004 | Droste et al. | |
| 2004/0243812 A1 | 12/2004 | Yui et al. | |
| 2005/0012640 A1 | 1/2005 | Kong et al. | |
| 2005/0037775 A1 | 2/2005 | Moeglein et al. | |
| 2005/0055567 A1 | 3/2005 | Libin et al. | |
| 2005/0070276 A1 | 3/2005 | McGarry | |
| 2005/0107114 A1 | 5/2005 | Ocock et al. | |
| 2005/0138110 A1 | 6/2005 | Redlich et al. | |
| 2005/0143171 A1 | 6/2005 | Loose | |
| 2005/0210104 A1 | 9/2005 | Torvinen | |
| 2005/0222768 A1 | 10/2005 | Tauchi et al. | |
| 2006/0046706 A1 | 3/2006 | Lin et al. | |
| 2006/0053389 A1 | 3/2006 | Michelman | |
| 2006/0099969 A1 | 5/2006 | Staton et al. | |
| 2006/0136998 A1 | 6/2006 | Oowaki et al. | |
| 2006/0155664 A1 | 7/2006 | Morikawa et al. | |
| 2006/0183486 A1 | 8/2006 | Mullen | |
| 2006/0246872 A1 | 11/2006 | Tarkkala | |
| 2006/0253570 A1 | 11/2006 | Biswas et al. | |
| 2006/0256005 A1 | 11/2006 | Thandu et al. | |
| 2006/0271797 A1 | 11/2006 | Ginggen et al. | |
| 2006/0277271 A1 | 12/2006 | Morse et al. | |
| 2006/0293057 A1 | 12/2006 | Mazerski et al. | |
| 2007/0028176 A1 | 2/2007 | Perdomo et al. | |
| 2007/0032225 A1 | 2/2007 | Konicek et al. | |
| 2007/0042790 A1 | 2/2007 | Mohi et al. | |
| 2007/0046423 A1 | 3/2007 | Baucom | |
| 2007/0046456 A1 | 3/2007 | Edwards et al. | |
| 2007/0049290 A1 | 3/2007 | Mullen | |
| 2007/0064882 A1 | 3/2007 | Ger et al. | |
| 2007/0067655 A1 | 3/2007 | Shuster | |
| 2007/0072616 A1 | 3/2007 | Irani | |
| 2007/0082707 A1 | 4/2007 | Flynt et al. | |
| 2007/0091037 A1 | 4/2007 | Lee | |
| 2007/0111726 A1 | 5/2007 | Lanbert et al. | |
| 2007/0150826 A1 | 6/2007 | Anzures et al. | |
| 2007/0150842 A1 | 6/2007 | Chaudhri et al. | |
| 2007/0180509 A1 | 8/2007 | Swartz et al. | |
| 2007/0218938 A1 | 9/2007 | Carter | |
| 2007/0245398 A1 | 10/2007 | Roden | |
| 2007/0264981 A1 | 11/2007 | Miller | |
| 2007/0275767 A1 | 11/2007 | Steele | |
| 2007/0281689 A1 | 12/2007 | Altman et al. | |
| 2007/0300140 A1 | 12/2007 | Makela et al. | |
| 2008/0005695 A1 | 1/2008 | Ozzie et al. | |

(56) References Cited

U.S. PATENT DOCUMENTS

| | | |
|---|---|---|
| 2008/0014964 A1 | 1/2008 | Sudit et al. |
| 2008/0020803 A1 | 1/2008 | Rios et al. |
| 2008/0032703 A1 | 2/2008 | Krumm et al. |
| 2008/0045232 A1 | 2/2008 | Cone |
| 2008/0051079 A1 | 2/2008 | Forsgren |
| 2008/0080688 A1 | 4/2008 | Burgan et al. |
| 2008/0082693 A1 | 4/2008 | Meijer et al. |
| 2008/0101658 A1 | 5/2008 | Ahern et al. |
| 2008/0111698 A1 | 5/2008 | Atherton |
| 2008/0126441 A1 | 5/2008 | Giampaolo et al. |
| 2008/0132252 A1 | 6/2008 | Altman et al. |
| 2008/0133708 A1 | 6/2008 | Alvarado et al. |
| 2008/0154780 A1 | 6/2008 | Soukup et al. |
| 2008/0227473 A1 | 9/2008 | Haney |
| 2008/0244005 A1 | 10/2008 | Sengupta et al. |
| 2008/0249969 A1 | 10/2008 | Tsui et al. |
| 2008/0254767 A1 | 10/2008 | Jin |
| 2008/0268870 A1 | 10/2008 | Houri |
| 2008/0305808 A1 | 12/2008 | Chan et al. |
| 2008/0318595 A1 | 12/2008 | Rofougaran |
| 2008/0320087 A1 | 12/2008 | Horvitz et al. |
| 2009/0005061 A1 | 1/2009 | Ward et al. |
| 2009/0005080 A1 | 1/2009 | Forstall et al. |
| 2009/0006566 A1 | 1/2009 | Veeramachaneni et al. |
| 2009/0006991 A1 | 1/2009 | Lindberg et al. |
| 2009/0036102 A1 | 2/2009 | Ho |
| 2009/0045927 A1 | 2/2009 | Atella |
| 2009/0089886 A1 | 4/2009 | Cheng et al. |
| 2009/0093688 A1 | 4/2009 | Mathur |
| 2009/0116703 A1 | 5/2009 | Schultz |
| 2009/0119590 A1 | 5/2009 | Kondziela et al. |
| 2009/0125918 A1 | 5/2009 | Kansai et al. |
| 2009/0157560 A1 | 6/2009 | Carter et al. |
| 2009/0158389 A1 | 6/2009 | Waltenberg et al. |
| 2009/0170532 A1 | 7/2009 | Lee et al. |
| 2009/0201896 A1 | 8/2009 | Davis et al. |
| 2009/0205041 A1 | 8/2009 | Michalske |
| 2009/0224867 A1 | 9/2009 | O'Shaughnessy et al. |
| 2009/0224931 A1 | 9/2009 | Dietz et al. |
| 2009/0224941 A1 | 9/2009 | Kansai et al. |
| 2009/0265794 A1 | 10/2009 | Apelqvist |
| 2009/0278738 A1 | 11/2009 | Gopinath |
| 2009/0282473 A1 | 11/2009 | Karlson et al. |
| 2009/0300525 A1 | 12/2009 | Jolliff et al. |
| 2010/0001967 A1 | 1/2010 | Yoo |
| 2010/0004005 A1 | 1/2010 | Pereira et al. |
| 2010/0020035 A1 | 1/2010 | Ryu et al. |
| 2010/0045519 A1 | 2/2010 | Lee |
| 2010/0056124 A1 | 3/2010 | Keating et al. |
| 2010/0066821 A1 | 3/2010 | Rosener et al. |
| 2010/0069007 A1 | 3/2010 | Nagasawa |
| 2010/0074450 A1 | 3/2010 | Liao |
| 2010/0090852 A1 | 4/2010 | Eitan et al. |
| 2010/0112955 A1 | 5/2010 | Krishnaswamy et al. |
| 2010/0115610 A1 | 5/2010 | Tredoux et al. |
| 2010/0127836 A1 | 5/2010 | Huang et al. |
| 2010/0127917 A1 | 5/2010 | Lin et al. |
| 2010/0127919 A1 | 5/2010 | Curran et al. |
| 2010/0130229 A1 | 5/2010 | Sridhara et al. |
| 2010/0134310 A1 | 6/2010 | Zheng et al. |
| 2010/0162180 A1 | 6/2010 | Dunnam et al. |
| 2010/0167714 A1 | 7/2010 | Howarter et al. |
| 2010/0190479 A1 | 7/2010 | Scott et al. |
| 2010/0210301 A1 | 8/2010 | Dietz et al. |
| 2010/0216509 A1 | 8/2010 | Riemer et al. |
| 2010/0227588 A1 | 9/2010 | Bradley |
| 2010/0253503 A1 | 10/2010 | Juang, Jr. |
| 2010/0255856 A1 | 10/2010 | Kansal et al. |
| 2010/0268779 A1 | 10/2010 | Rao |
| 2010/0285815 A1 | 11/2010 | Treu et al. |
| 2010/0291950 A1 | 11/2010 | Lin et al. |
| 2010/0302028 A1 | 12/2010 | Desai et al. |
| 2010/0306832 A1 | 12/2010 | Mu et al. |
| 2010/0311336 A1 | 12/2010 | Huotari et al. |
| 2010/0313050 A1 | 12/2010 | Harrat et al. |
| 2010/0321155 A1 | 12/2010 | Ballard |
| 2010/0324819 A1 | 12/2010 | Nurminen et al. |
| 2010/0325194 A1 | 12/2010 | Williamson et al. |
| 2011/0010340 A1 | 1/2011 | Hung et al. |
| 2011/0014933 A1 | 1/2011 | Karmarkar et al. |
| 2011/0021213 A1 | 1/2011 | Carr |
| 2011/0021234 A1 | 1/2011 | Tibbitts et al. |
| 2011/0028138 A1 | 2/2011 | Davies-Moore et al. |
| 2011/0047484 A1 | 2/2011 | Mount et al. |
| 2011/0063098 A1 | 3/2011 | Fischer et al. |
| 2011/0063138 A1 | 3/2011 | Berkobin et al. |
| 2011/0065419 A1 | 3/2011 | Book et al. |
| 2011/0068923 A1 | 3/2011 | Burket et al. |
| 2011/0070829 A1 | 3/2011 | Griffin et al. |
| 2011/0078758 A1 | 3/2011 | Kohlenberg et al. |
| 2011/0093161 A1 | 4/2011 | Zhou et al. |
| 2011/0111728 A1 | 5/2011 | Ferguson et al. |
| 2011/0111772 A1 | 5/2011 | Tysowski |
| 2011/0140956 A1 | 6/2011 | Henry et al. |
| 2011/0151890 A1 | 6/2011 | Platt et al. |
| 2011/0167342 A1 | 7/2011 | De La Pena et al. |
| 2011/0167344 A1 | 7/2011 | Pan |
| 2011/0169654 A1 | 7/2011 | Ketari |
| 2011/0171958 A1 | 7/2011 | Hua et al. |
| 2011/0197160 A1 | 8/2011 | Kim et al. |
| 2011/0211511 A1 | 9/2011 | Bakthavathsalu et al. |
| 2011/0215903 A1 | 9/2011 | Yang et al. |
| 2011/0215952 A1 | 9/2011 | Aria et al. |
| 2011/0237221 A1 | 9/2011 | Prakash et al. |
| 2011/0241827 A1 | 10/2011 | Varoglu |
| 2011/0244837 A1 | 10/2011 | Murata et al. |
| 2011/0247045 A1 | 10/2011 | Rajagopal et al. |
| 2011/0250840 A1 | 10/2011 | Lee et al. |
| 2011/0250875 A1 | 10/2011 | Huang et al. |
| 2011/0254792 A1 | 10/2011 | Waters et al. |
| 2011/0264246 A1 | 10/2011 | Pantoja et al. |
| 2011/0267171 A1 | 11/2011 | Li et al. |
| 2011/0275321 A1 | 11/2011 | Zhou et al. |
| 2011/0276901 A1 | 11/2011 | Zambetti |
| 2011/0283185 A1 | 11/2011 | Obasanjo et al. |
| 2011/0283241 A1 | 11/2011 | Miller et al. |
| 2011/0283311 A1 | 11/2011 | Luong |
| 2011/0294520 A1 | 12/2011 | Zhou et al. |
| 2011/0299422 A1 | 12/2011 | Kim et al. |
| 2011/0307166 A1 | 12/2011 | Hiestermann et al. |
| 2011/0319051 A1 | 12/2011 | Reitnour |
| 2011/0319094 A1 | 12/2011 | Usui et al. |
| 2011/0320518 A1 | 12/2011 | Tsui et al. |
| 2012/0008526 A1 | 1/2012 | Borghei |
| 2012/0023573 A1 | 1/2012 | Jianxiong |
| 2012/0046020 A1 | 2/2012 | Tomasini |
| 2012/0046040 A1 | 2/2012 | Chatterjee |
| 2012/0084691 A1 | 4/2012 | Yun |
| 2012/0084734 A1 | 4/2012 | Weerapan |
| 2012/0084737 A1 | 4/2012 | Gimpl et al. |
| 2012/0098768 A1 | 4/2012 | Bendewald et al. |
| 2012/0100895 A1 | 4/2012 | Priyantha et al. |
| 2012/0115512 A1 | 5/2012 | Grainger et al. |
| 2012/0136689 A1 | 5/2012 | Ickman et al. |
| 2012/0144468 A1 | 6/2012 | Pratt et al. |
| 2012/0146850 A1 | 6/2012 | Liu et al. |
| 2012/0172027 A1 | 7/2012 | Partheesh et al. |
| 2012/0234058 A1 | 9/2012 | Neil et al. |
| 2012/0242470 A1 | 9/2012 | Morgan et al. |
| 2012/0242906 A1 | 9/2012 | Shintani et al. |
| 2012/0244883 A1 | 9/2012 | Tibbitts et al. |
| 2012/0245838 A1 | 9/2012 | Van Doorselaer |
| 2012/0268249 A1 | 10/2012 | Kansal |
| 2012/0282887 A1 | 11/2012 | Khoo et al. |
| 2012/0284256 A1 | 11/2012 | Mahajan et al. |
| 2012/0284769 A1 | 11/2012 | Dixon et al. |
| 2012/0289217 A1 | 11/2012 | Riemer et al. |
| 2012/0289244 A1 | 11/2012 | Goyal |
| 2012/0295645 A1 | 11/2012 | Yariv et al. |
| 2012/0302256 A1 | 11/2012 | Pai et al. |
| 2012/0306637 A1 | 12/2012 | McGough et al. |
| 2012/0309376 A1 | 12/2012 | Huang et al. |
| 2012/0309413 A1 | 12/2012 | Grosman et al. |
| 2012/0317162 A1 | 12/2012 | Endsley et al. |

(56) References Cited

U.S. PATENT DOCUMENTS

| | | |
|---|---|---|
| 2013/0006469 A1 | 1/2013 | Green et al. |
| 2013/0006522 A1 | 1/2013 | Vellaikal et al. |
| 2013/0023246 A9 | 1/2013 | Ellingham et al. |
| 2013/0031169 A1 | 1/2013 | Axelrod et al. |
| 2013/0031601 A1 | 1/2013 | Bott |
| 2013/0036211 A1 | 2/2013 | Messer et al. |
| 2013/0040629 A1 | 2/2013 | Sprigg et al. |
| 2013/0040711 A1 | 2/2013 | Kim et al. |
| 2013/0045760 A1 | 2/2013 | Obermeyer et al. |
| 2013/0065613 A1 | 3/2013 | Stopel et al. |
| 2013/0072172 A1 | 3/2013 | Chang et al. |
| 2013/0072226 A1 | 3/2013 | Thramann |
| 2013/0084847 A1 | 4/2013 | Tibbitts et al. |
| 2013/0085861 A1 | 4/2013 | Dunlap |
| 2013/0099977 A1 | 4/2013 | Sheshadri et al. |
| 2013/0130742 A1 | 5/2013 | Dietz et al. |
| 2013/0138334 A1 | 5/2013 | Meredith et al. |
| 2013/0173513 A1 | 7/2013 | Chu et al. |
| 2013/0188503 A1 | 7/2013 | Anepu et al. |
| 2013/0225151 A1 | 8/2013 | King et al. |
| 2013/0225152 A1 | 8/2013 | Matthews, III et al. |
| 2013/0227431 A1 | 8/2013 | Vasudevan et al. |
| 2013/0232552 A1 | 9/2013 | Brush et al. |
| 2013/0295872 A1 | 11/2013 | Guday et al. |
| 2013/0295913 A1 | 11/2013 | Matthews, III et al. |
| 2013/0295970 A1* | 11/2013 | Sheshadri et al. ......... 455/456.6 |
| 2013/0298037 A1 | 11/2013 | Matthews, III et al. |
| 2013/0303143 A1 | 11/2013 | Schrader et al. |
| 2013/0305354 A1 | 11/2013 | King et al. |
| 2014/0068755 A1 | 3/2014 | King et al. |
| 2014/0167961 A1 | 6/2014 | Finlow-Bates |
| 2014/0213295 A1 | 7/2014 | Conklin |
| 2014/0278054 A1 | 9/2014 | Tidd et al. |
| 2014/0370909 A1 | 12/2014 | Natucci, Jr. et al. |
| 2014/0370911 A1 | 12/2014 | Gorgenyi et al. |
| 2015/0011203 A1 | 1/2015 | Schrader et al. |
| 2016/0007151 A1 | 1/2016 | Birch et al. |
| 2016/0248906 A1 | 8/2016 | Schrader et al. |
| 2018/0049132 A1 | 2/2018 | Gorgenyi et al. |

FOREIGN PATENT DOCUMENTS

| | | |
|---|---|---|
| CN | 101778165 | 7/2010 |
| CN | 101828162 | 9/2010 |
| EP | 2169946 | 3/2010 |
| EP | 2293016 | 3/2011 |
| EP | 2369864 | 9/2011 |
| EP | 2451139 | 5/2012 |
| EP | 2469442 | 6/2012 |
| JP | 07203015 | 8/1995 |
| JP | 2002142010 | 5/2002 |
| JP | 2002530783 | 9/2002 |
| JP | 2003032353 | 1/2003 |
| JP | 2004152276 | 5/2004 |
| JP | 2005043355 | 2/2005 |
| JP | 3669702 | 7/2005 |
| JP | 2005535169 | 11/2005 |
| JP | 2007257140 | 10/2007 |
| JP | 2009521753 | 6/2009 |
| JP | 2009171160 | 7/2009 |
| JP | 2010503082 | 1/2010 |
| JP | 2010518416 | 5/2010 |
| JP | 2010286924 | 12/2010 |
| JP | 2012505481 | 3/2012 |
| JP | 2012247366 | 12/2012 |
| JP | 2013093036 | 5/2013 |
| KR | 20050037613 | 4/2005 |
| KR | 20100083396 | 7/2010 |
| KR | 20110093528 | 8/2011 |
| RU | 2354990 | 5/2009 |
| RU | 2448429 | 4/2012 |
| RU | 2478987 | 4/2013 |
| WO | WO-2005031544 | 4/2005 |
| WO | WO-2006088273 | 8/2006 |
| WO | WO-2006099535 | 9/2006 |
| WO | WO-2007130123 | 11/2007 |
| WO | WO-2009105666 | 8/2009 |
| WO | WO-2009152472 | 12/2009 |
| WO | WO-2010103584 | 9/2010 |
| WO | WO-2011135359 | 11/2011 |
| WO | WO-2012047412 | 4/2012 |
| WO | WO-2012096603 | 7/2012 |
| WO | WO-2013056145 | 4/2013 |
| WO | WO-2013061156 | 5/2013 |

OTHER PUBLICATIONS

"Final Office Action", U.S. Appl. No. 13/409,905, dated Nov. 19, 2013, 13 Pages.

"International Search Report and Written Opinion", Application No. PCT/US2013/060500, dated Mar. 5, 2014, 10 pages.

"International Search Report and Written Opinion", Application No. PCT/US2013/060502, dated Mar. 5, 2014, 10 pages.

"International Search Report and Written Opinion", Application No. PCT/US2013/050963, dated Nov. 8, 2013, 14 pages.

"Non-Final Office Action", U.S. Appl. No. 12/417,752, dated Oct. 29, 2013, 16 Pages.

"Non-Final Office Action", U.S. Appl. No. 13/340,702, dated Mar. 11, 2014, 15 Pages.

"Notice of Allowance", U.S. Appl. No. 12/912,456, dated Jan. 7, 2014, 9 Pages.

Boytsov, et al.,' "Context Prediction in Pervasive Computing Systems: Achievements and Challenges", International Journal on Computer Science and Engineering vol. 2, No. 04, 2010, 29 Pages.

Consolvo, et al.,' "Location Disclosure to Social Relations: Why, When, & What People Want to Share", Retrieved From: http://cens.ucla.edu/~mhr/cs219/privacy/consolvo05.pdf, Apr. 2-7, 2005, 11 Pages.

Harper, et al.,' "Glancephone—An Exploration of Human Expression", In MobileHCI09, Sep. 15-18, 2009, Bonn, Germany, 9 pages., Sep. 15-18, 2009, 10 Pages.

Makker, et al.,' "A Novel Approach for Predicting User Behavior for Improving Web Performance", International Journal on Computer Science and Engineering, vol. 02, No. 04, 2010, pp. 1233-1236., 2010, 4 Pages.

Schreiber, et al.,' "Reducing User Perceived Latency in Mobile Processes", IEEE International Conference on Web Services, 201 0, pp. 235-242., 2010, 18 Pages.

Schreiber, et al.,' "Reducing User Perceived Latency with a Middleware for Mobile SOA Access", IEEE International Conference on Web Services, 2009, pp. 366-373., 2009, 18 Pages.

Yan, et al.,' "Fast App Launching for Mobile Devices Using Predictive User Context", MobiSys'12, Jun. 25-29, 2012, Low Wood Bay, Lake District, UK., Jun. 25-29, 2012, 14 pages.

Campbell, Mikey, "Apple Brings Customizable Geofencing to Find My Friends in Update", Retrieved at <<http://appleinsider.com/articles/13/03/28/apple-brings-customizable-geofencing-notifications-in-find-my-friends-update>>, Mar. 28, 2013, pp. 10.

Dandu, Ravi, "Building Next Generation Location-Based Applications", Retrieved at <<https://www.uplinq.com/system/files/session/slides/Tapping_into_the_Next_Generation_wednesday_430.pdf>>, Jun. 27, 2012, pp. 22.

Jacobs, Bart, "Geofencing with Core Location", Retrieved at <<http://mobile.tutsplus.com/tutorials/iphone/geofencing-with-core-location/>>, Mar. 18, 2013, pp. 14.

Israel, Shel, "How VinTank is Building a Geo-Fence Around Wine Country", Retrieved at <<http://www.forbes.com/sites/shelisrael/2013/03/20/how-vintank-is-building-a-geo-fence-around-wine-country/>>, Mar. 20, 2013, pp. 7.

Gupta, Monika, "Broadcom's Latest GPS Tech Zooms in on Geofencing", Retrieved at http://blog.broadcom.com/mobile-wireless/ahead-of-mobile-world-congress-broadcoms-latest-gps-tech-zooms-in-on-geofencing/?utm_source=&utm_medium=&utm_campaign=>>, Feb. 19, 2013, pp. 3.

"Context-Based Device Action Prediction", U.S. Appl. No. 13/340,702, filed Dec. 30, 2011, pp. 60.

"Automatic Context Sharing with Privacy", U.S. Appl. No. 13/409,905, filed Mar. 1, 2012, pp. 44.

(56) References Cited

OTHER PUBLICATIONS

"Final Office Action", U.S. Appl. No. 12/417,752, (dated Jul. 17, 2013),18 pages.
"PCT Search Report and Written Opinion", Application No. PCT/US2012/070431, (dated May 31, 2013),10 pages.
"Non-Final Office Action", U.S. Appl. No. 13/090,474, dated May 6, 2014, 12 pages.
"Final Office Action", U.S. Appl. No. 12/417,752, dated Feb. 25, 2014, 22 Pages.
"Calendar and Reminders Programming Guide", Apple, Inc., Available at <http://developer.apple.com/library/ios/documentation/DataManagement/Conceptual/EventKitProgGuide/EventKitProgGuide.pdf>,(Jul. 17, 2012), 25 pages.
"Final Office Action", U.S. Appl. No. 12/417,752, (dated Sep. 13, 2012),18 pages.
"Final Office Action", U.S. Appl. No. 12/912,456, (dated Jan. 9, 2013), 21 pages.
"Flextrack Lommy Phoenix platforms Technical Description Draft", Retrieved from <http://tayeb.fr/wiki_uploads/balise/FlextrackPhoenix_GT.pdf> on Apr. 15, 2013, pp. 1-36.
"Geo-fencing: Does geo-fencing in iOS 6 Poll your Location Multiple Times a Day?", Retrieved from <http://www.quora.com/Geo-fencinq/Does-geo-fencing-in-iOS-6-poll-your-location-multiple-times-a-day> on Apr. 12, 2013, 2 pages.
"Ignite Where & Launch Pad", *O'Reilly, Where 2.0 Conference 2008*, retrieved from <http://en.oreilly.com/where2008/public/schedule/detail/2572> on Feb. 5, 2009,(May 2008), 4 pages.
"Non Final Office Action", U.S. Appl. No. 12/417,752, (dated Jun. 28, 2011),14 pages.
"Non-Final Office Action", U.S. Appl. No. 12/417,752, (dated May 24, 2013),17 pages.
"Non-Final Office Action", U.S. Appl. No. 12/912,456, (dated May 4, 2012),14 pages.
"Non-Final Office Action", U.S. Appl. No. 12/912,456, (dated Sep. 11, 2012),15 pages.
"Non-Final Office Action", U.S. Appl. No. 13/090,474, (dated Apr. 26, 2013),11 pages.
"PCT Search Report and Written Opinion", Application No. PCT/US2012/034598, (dated Oct. 12, 2012), 9 pages.
"PCT Search Report and Written Opinion", Application No. PCT/US2012/071562, (dated Apr. 24, 2013), 9 pages.
"To Create a Geo-fencing Policy for iOS Devices", Retrieved from <http://support.citrix.com/proddocs/topic/xmob-dm-8/xm-dm-manage-geofence-ios-tsk.html> on Apr. 12, 2013, (dated Feb. 8, 2013),1 page.
"VIMOCOS—Vienna Mobile Context Sharing", Retrieved on Jan. 2, 2012 from <<http://www.infosys.tuwien.ac.at/prototypes/VIMOCOS/VIMOCOS_index.html>>2 Pages.
"What's An Android? And Other Smart(phone) Questions", Retrieved from: <http://bestbuybusinessdistrict.com/knowlege-center/58-what%27s-an-android-and-other-smart-phone-questions> on Feb. 7, 2011, (dated Sep. 6, 2010), 4 pages.
Aalto, Lauri et al., "Bluetooth and WAP Push Based Location-Aware Mobile Advertising System", *ACM, MobiSYS '04*, Jun. 6-9, 2004, Boston, MA, retrieved from <http://www.mediateam.oulu.fi/publications/pdf/496.pdf> on Feb. 5, 2009,(dated Jun. 6, 2004),10 pages.
Abdelzaher, et al., "Mobiscopes for Human Spaces", *IEEE Pervasive Computing*, vol. 6, No. 2, (Apr. 2007),11 pages.
Abdesslem, et al., "Less is More: Energy-Efficient Mobile Sensing with SenseLess", *MobiHeld an ACM SIGCOMM workshop*, (Aug. 17, 2009), pp. 61-62.
Agarwal, Yuvraj et al., "Somniloquy: Augmenting Network Interfaces to Reduce PC Energy Usage", *Symposium on Networked Systems Design and Implementation (NSDI), 2009*, available at <http://www.usenix.org/events/nsdi09/tech/full_papers/agarwal/agarwal.pdf>,(Apr. 23, 2009), pp. 365-380.
Aleksy, Markus et al., "Techniques for Efficient Resource Management for Context-Sensitive Mobile Applications", *International Conference on Complex Intelligent and Software Intensive Systems (CISIS)*, Retrieved at >>http://ieeexplore.ieee.org/stamp/stamp.jsp?tp=&arnumber=4606684>>,(Mar. 4, 2008), 6 Pages.
Azizyan, Martin et al., "SurroundSense: Mobile Phone Localization Using Ambient Sound and Light", retrieved from <http://synrg.ee.duke.edu/papers/surroundsense-poster.pdf> on Feb. 5, 2009,(Sep. 22, 208),1 page.
Bahl, Paramvir et al., "RADAR: An In-Building RF-based User Location and Tracking System", *Microsoft Research, Proceedings of IEEE Infocom 2000, Tel-Aviv, Israel*, retrieved from <https://3research.microsoft.com/en-us/um/people/padmanab/papers/infocom2000.pdf> on Feb. 5, 2009,(Mar. 2000),10 pages.
Balakrishnan, Hari et al., "ITR: Scalable Location-Aware Monitoring (SLAM) Systems", *Laboratory for Computer Science & Department of EECS, MIT*, Cambridge, MA, retrieved from <http://nms.lcs.mit.edu/projects/slam/prop.pdf> on Feb. 5, 2009,(Nov. 9, 2001), 31 pages.
Balasubramanian, Niranjan et al., "Energy Consumption in Mobile Phones: A Measurement Study and Implications for Network Applications", *Proceedings of the 9th ACM SIGCOMM conference on Internet measurement conference (IMC)*, Retrieved at <<http://www.cs.umass.edu/-arunab/paper/tailender-imc09.pdf,(Nov. 4, 2009),14 Pages.
Barroso, et al., "The Case for Energy-Proportional Computing", *IEEE Computer Society*, vol. 40. No. 12, (Dec. 2007), pp. 33-37.
Burke, et al., "Participatory Sensing", *WSW at SenSys*, (Oct. 31, 2006), 5 pages.
Chiu, et al., "Playful Bottle: A Mobile Social Persuasion System to Motivate Healthy Water Intake", *Proceedings of the 11th international conference on Ubiquitous computing*, (2009),10 pages.
Consolvo, "Flowers or a Robot Army?: Encouraging Awareness & Activity with Personal, Mobile Displays", *Proceedings of the 10th International Conference on Ubiquitous Computing*, vol. 12, No. 4, Publisher: ACM Press, (Sep. 2008),10 pages.
Constandache, et al., "Energy-Aware Localization Using Mobile Phones", retrieved from <http://www.cs.duke.edu/~ionut/2008_mobisys.pdf> on Feb. 5, 2009,(Jun. 2008),1 page.
Constandache, Ionut et al., "Energy-efficient Localization Via Personal Mobility Profiling", *In Proceedings of MobiCASE 2009*, Available at <http://synrg.ee.duke.edu/papers/mobicase09.pdf>,(Oct. 2009), pp. 1-20.
Domingos, et al., "Mining High-Speed Data Streams", *Proceedings of the Sixth ACM SIGKDD International Conference on Knowledge Discovery and Data Mining*, (2000), 10 Pages.
Flinn, Jason "Extending Mobile Computer Battery Life through Energy-Aware Adaptation", *School of Computer Science*, Carnegie Mellon University, Pittsburgh, PA, retrieved from <http://reports-archive.adm.cs.cmu.edu/anon/2001/CMU-CS-01-171.pdf> from Feb. 5, 2009,(Dec. 2001),165 pages.
Foster, et al., "Precision and accuracy of an ankle-worn accelerometer-based pedometer in step counting and", *Preventive Medicine*, vol. 41, No. 3-4, (Oct. 2005), pp. 778-783.
Gaonkar, Shravan et al., "Micro-Blog: Sharing and Querying Content through Mobile Phones and Social Participation", *ACM, MobiSys 2008*, Jun. 17-20, 2008, Breckenridge, CO retrieved from <http://www.cs.duke.edu/~Ipcox/romit-microblog.pdf> on Feb. 5, 2009,(Jun. 17, 2008),13 pages.
Hoh, et al., "Virtual Trip Lines for Distributed Privacy-Preserving Traffic Monitoring",, *Proceedings of the 6th International Conference on Mobile Systems, Applications, and Services* (Jun. 2008),14 pages.
Hull, et al., "CarTel: A Distributed Mobile Sensor Computing System", *Proceedings of The 4th international conference on Embedded networked sensor systems*, (Nov. 2006), 14 pages.
Kang, et al., "A Scalable and Energy-Efficient Context Monitoring Framework for Mobile Personal Sensor Networks", *IEEE Transactions on Mobile Computing*, vol. 9, No. 5, (May 2010), pp. 686-702.
Kansal, Aman et al., "Location and Mobility in a Sensor Network of Mobile Phones", *Microsoft Research, Microsoft Corporation*, retrieved from <http://research.microsoft.com.com/apps/pubs/default.aspx?id=70416> on Feb. 5, 2009,(Jun. 4, 2007),1 pages.
Krumm, John et al., "Predestination: Inferring Destinations from Partial Trajectories", *UbiComp 2006: The Eighth International*

(56) References Cited

OTHER PUBLICATIONS

Conference on Ubiquitous Computing, Sep. 17-21, 2006, Orange County, CA, retrieved from <http://research.microsoft.com/en-us/um/people/horvitzlpredestination.pdf> on Feb. 5, 2009,(Sep. 17, 2006),18 pages.

Krumm, John et al., "RightSPOT: A Novel Sense of Location for a Smart Personal Object", *Proceedings of Ubicomp 2003*, Seattle, WA, retrieved from <http://research.microsoft.com/en-us/um/people/horvitz/rightspot.htm> on Feb. 5, 2009,(2003),1 pages.

Lamarca, Anthony et al., "Place Lab: Device Positioning Using Radio Beacons in the Wild", *In Proceedings of Pervasive 2005*, Munich, Germany, retrieved from <http://www.placelab.org/publications/pubs/pervasive-placelab-2005-final.pdf> on Feb. 5, 2009,(2005),18 pages.

Lee, et al., "Mobile Phone-To-Phone Personal Context Sharing", *In Proceedings of 9th International Conference Communications and Information Technology*, (Sep. 28, 2009), 6 Pages.

Lester, et al., "Validated Caloric Expenditure Estimation using a Single Body-Worn Sensor", *Proceedings of the 11th international conference on Ubiquitous computing*, (Oct. 2009),10 pages.

Lester, et al., "A Practical Approach to Recognizing Physical Activities", *Pervasive Computing in Pervasive Computing*, vol. 3968, (2006),17 pages.

Liao, Lin et al., "Extracting Places and Activities from GPS Traces Using Hierarchical Conditional Random Fields", *The International Journal of Robotics Research*, vol. 26, No. 1, 119-134, retrieved from <http://ijr.sagepub.com/cgi/content/26/1/119> on Feb. 5, 2009,(2007), 20 pages.

Lin, Kaisen et al., "Energy-Accuracy Trade-off for Continuous Mobile Device Location", *In Proceedings of ACM Mobisys 2010*, Available at <http://research.microsoft.com/apps/pubs/default.aspx?id=120831>,(Jun. 15, 2010), pp. 1-14.

Lin, Tsung-Han et al., "Enabling Energy-Efficient and Quality Localization Services", *National Taiwan University*, retrieved from <http://nslab.ee.ntu.edu.tw/publication/conf/qols-percom06.pdf> on Feb. 5, 2009,(2006), 4 pages.

Lu, et al., "Sound Sense: Scalable Sound Sensing for People-Centric Sensing Applications on Mobile Phones", *Proceedings of the 7th international conference on Mobile systems, applications, and services*, (Jun. 2009),14 pages.

Miluzzo, et al., "Sensing Meets Mobile Social Networks: The Designs, Implementation and Evaluation of the CenceMe Application", *In Proceedings of the 6th ACM Conference on Embedded Network Sensor Systems*, (Nov. 5, 2008),14 Pages.

Mohan, et al., "Nericell: Rich Monitoring of Road and Traffic Conditions using Mobile Smartphones", *Proceedings of the 6th ACM conference on Embedded network sensor systems*, (Nov. 2008), 14 pages.

Natili, Giorgio et al., "Web Caching and Web Prefetching", <<http://www.mobilerevamp.org/2011/08/22/web-cachinq-and-web-prefetching/>>, (Aug. 22, 2011), 5 Pages.

Oh, et al., "A Mobile Context Sharing System using Activity and Emotion Recognition with Bayesian Networks", *In 7th International Conference on Ubiquitous Intelligence & Computing and 7th International Conference on Autonomic & Trusted Computing*, (Oct. 26, 2010), 6 Pages.

Oliver, et al., "Health Gear: A Real-Time Wearable System for Monitoring and Analyzing Physiological Signals", (Apr. 2006), pp. 1-4.

Paek, Jeongyeup et al., "Energy-Efficient Rate-Adaptive GPS-based Positioning for Smartphones", *In Proceedings of MobiSys 2010*, Available at <http://enl.usc.edu/papers/cache/Paek10a.pdf>,(Jun. 2010),16 pages.

Peng, Chunyi et al., "BeepBeep: A High Accuracy Acoustic Ranging System Using COTS Mobile Devices", *ACM, SenSys 2007*, Nov. 6-9, 2007, Sydney, Australia, retrieved from <http://research.microsoft.com/en-us/groups/wn/sensys106-beepbeep.pdf> on Feb. 5, 2009,(Nov. 6, 2007),14 pages.

Pering, et al., "The PSI Board: Realizing a Phone-Centric Body Sensor Network", *In 4th International Workshop on Wearable and Implantable Body Sensor Networks*, (2007), 6 pages.

Person, Jon "Writing Your Own GPS Applications: Part 2", *The Code Project*, retrieved from <http://www.codeproject.com/KB/mobile/WritingGPSApplications2.aspx> on Feb. 5, 2009,(Dec. 20, 2004),13 pages.

Raento, et al., "Context Phone: A Prototyping Platform for Context-Aware Mobile Applications", *In IEEE Pervasive Computing*, vol. 4, Issue 2, (Apr. 2005), pp. 51-59.

Ravi, et al., "Context-aware Battery Management for Mobile Phones", *Proceedings of the Sixth Annual IEEE International Conference on Pervasive Computing and Communications (PERCOM)*, Retrieved at >>http://www.cs.rutgers.edu/discolab/smartphone/papers/percom08.pdf>>,(2008),10 Pages.

Riva, et al., "The Urbanet Revolution: Sensor Power to the People!", *IEEE Pervasive Computing*, vol. 6, No. 2, (Apr. 2007), pp. 41-49.

Ruairi, Ronan M., et al., "An Energy-Efficient, Multi-Agent Sensor Network for Detecting Diffuse Events", *IJCAI-07*, retrieved from <http://www.aaai.org/Papers/IJCAI/2007/IJCAI07-224.pdf> on Feb. 5, 2009,(2007), pp. 1390-1395.

Schindler, Grant et al., "City-Scale Location Recognition", *IEEE Computer Society Conference on Computer Vision and Pattern Recognition (CVPR)*, retrieved from <http://www.cc.gatech.edu/~phlosoft/files/schindler07cvpr2.pdf> on Feb. 5, 2009,(2007), 7 pages.

Schreiber, et al., "Reducing User Perceived Latency with a Proactive Prefetching Middleware for Mobile SOA Access", *International Journal of Web Services Research*, vol. 8, No. 1, Retrieved from <<http://www.informatik.uni-trier.de/~ley/db/journals/jwsr/jwsr8.html>>,(2011),18 Pages.

Shin, et al., "DEAMON: Energy-efficient sensor monitoring", *6th Annual IEEE Communications Society Conference on Sensor, Mesh and Ad Hoc Communications and Networks*, (Jun. 22, 2009), 9 pages.

Smailagic, Asim et al., "Location Sensing and Privacy in a Context-Aware Computing Environment", *IEEE Wireless Communications*, retrieved from <http://diuf.unifr.ch/pai/education/2002_ 2003/seminar/winter/telecom/01043849.pdf> on Feb. 5, 2009,(Oct. 2002), pp. 10-17.

Sun, Guolin et al., "Signal Processing Techniques in Network-aided Positioning", *IEEE Signal Processing Magazine*, Available at <http://www.cspl.umd.edu/sig/publications/sun_survey_200507.pdf>,(Jul. 2005), pp. 12-23.

Wang, et al., "A Framework of Energy Efficient Mobile Sensing for Automatic User State Recognition", *Proceedings o the 7th international conference on Mobile systems, applications, and services*, (Jun. 2009),14 pages.

Woodman, et al., "Pedestrian Localisation for Indoor Environments", *Proceedings of the 10th international conference on Ubiquitous computing*, (Sep. 2008),10 pages.

Youssef, Moustafa et al., "The Horus WLAN Location Determination System", *Department of Computer Science, University of Maryland*, retrieved from <http://www.cs.umd.edu/~moustafa/papers/horus_usenix.pdf> on Feb. 5, 2009,(2005), 14 pages.

Yu, et al., "Personalized Awareness and Safety with Mobile Phones as Sources and Sinks", *Proceedings of Urbansense, workshop held in conjunction with SenSys*, (Nov. 4, 2008), pp. 26-30.

Zhang, Kaifu et al., "The Two Facets of the Exploration-Exploitation Dilemma", *Proceedings of the IEEE/WIC/ACM International Conference on Intelligent Agent Technology (IAT '06)*, retrieved from<http://ieeexplore.ieee.org/ielx5/4052878/4052879/04052945.pdf?tp=> on Feb. 5, 2009,(2006), 7 pages.

Zhuang, Zhenyun et al., "Improving Energy Efficiency of Location Sensing on Smartphones", *In Proceedings of MobiSys 2010*, Available at <http://www.deutsche-telekom-laboratories.com/~kyuhan/papers/MobiSys10Kim.pdf>,(Jun. 2010),15 pages.

"Final Office Action", U.S. Appl. No. 13/090,474, dated Nov. 25, 2014, 13 pages.

"Non-Final Office Action", U.S. Appl. No. 13/409,905, dated Apr. 1, 2013, 11 pages.

(56) References Cited

OTHER PUBLICATIONS

"Non-Final Office Action", U.S. Appl. No. 13/409,905, dated Nov. 3, 2014, 14 pages.
"Non-Final Office Action", U.S. Appl. No. 13/918,776, dated Oct. 22, 2014, 18 pages.
"Non-Final Office Action", U.S. Appl. No. 13/918,818, dated Nov. 20, 2014, 18 pages.
"Notice of Allowance", U.S. Appl. No. 13/340,702, dated Jul. 29, 2014, 10 Pages.
"Apple—Batteries—iPhone", Available at: http://www.apple.com/batteries/maximizing-performance/, Dec. 29, 2011, 9 pages.
"Foreign Office Action", CN Application No. 201210592889.8, dated May 6, 2015, 14 pages.
"Foreign Office Action", EP Application No. 12863619.8, dated May 13, 2015, 5 pages.
"International Preliminary Report on Patentability", Application No. PCT/US2012/070431, dated Jul. 10, 2014, 7 pages.
"International Search Report and Written Opinion", Application No. PCT/US2013/060501, dated Apr. 13, 2015, 19 Pages.
"iOS 5 slowing iPhone 4 and 4S complaints", Retrieved at: http://www.phonesreview.co.uk/2011/10/25/ios-5-slowing-iphone-4-and-4s-complaints/, Oct. 10, 2011, 2 pages.
"Link prefetching FAQ", Retrieved at: https://developer.mozilla.org/en-US/docs/Web/Http/Link_prefetching_FAQ, Mar. 3, 2003, 5 pages.
"Notice of Allowance", U.S. Appl. No. 13/340,702, dated Jul. 8, 2015, 8 pages.
"Supplementary European Search Report", EP Application No. 12863619.8, dated May 4, 2015, 4 pages.
"Tasker", Retrieved from: https://web.archive.org/web/20101229145544/http://tasker.dinglisch.net/, Dec. 29, 2010, 2 pages.
Aggarwal,"Caching on the World Wide Web", IEEE Trans. Knowl. Data Eng., vol. 11, No. 1, 1999, 16 pages.
Bohmer,"Falling Asleep with Angry Birds, Facebook and Kindle—A Large Scale Study on Mobile Application Usage", In Proceedings of the 13th International Conference on Human Computer Interaction with Mobile Devices and Services, Aug. 11, 2011, 11 pages.
Chu,"Mobile Apps: It's Time to Move Up to CondOS", In Proceedings of the 13th USENIX Conference on Hot Topics in Operating Systems, Apr. 15, 2011, 5 pages.
Garlan,"Project Aura: Toward Distraction-Free Pervasive Computing", IEEE Pervasive Computing, vol. 1, 2002, 10 pages.
Joo,"Fast: Quick Application Launch on Solid-State Drives", Proceedings of the 9th USENIX Conference on File and Storage Technologies, Available at <http://static.usenix.org/event/fast11/tech/full_papers/Joo.pdf>, Feb. 15, 2011, 14 pages.
Kamisaka,"Operation Prediction for Context-Aware User Interfaces of Mobile Phones", 2009 Ninth Annual International Symposium on Applications and the Internet, 2009, 7 pages.
Lymberopoulos,"PocketWeb: Instant Web Browsing for Mobile Devices", in ASPLOS'12, 2012, 12 pages.
Miller,"Geographic Data Mining and Knowledge Discovery", Handbook of Geographic Information Science, Taylor & Francis, Inc., 2009, 20 pages.
Qian,"Profiling Resource Usage for Mobile Applications: A Cross-layer Approach", In Proceedings of the 9th international conference on Mobile systems, applications, and services, Jun. 28, 2011, 14 pages.
Satyanarayanan,"Pervasive Computing: Vision and Challenges", In IEEE Personal Communications, 2001, Aug. 2001, 10 pages.
Shepard,"LiveLab: Measuring Wireless Networks and Smartphone Users in the Field", SIGMETRICS Performance Evaluation Review, vol. 38, Issue 3, Jan. 3, 2011, 5 pages.
Wray,"Daily Tip: How to make your iPhone camera launch instantly [Jailbreak]", Retrieved from: http://www.imore.com/daily-tip-iphone-camera-launch-instantly-jailbreak, Apr. 20, 2011, 11 pages.
Zhu,"Efficient Elastic Burst Detection in Data Streams", In KDD '03, Proceedings of the Ninth ACM SIGKDD international conference on Knowledge Discovery and Data Mining, Aug. 24, 2003, 10 pages.
"Foreign Office Action", CN Application No. 201210592889.8, dated Dec. 3, 2015, 6 pages.
"Non-Final Office Action", U.S. Appl. No. 13/090,474, dated Dec. 3, 2015, 14 pages.
"Non-Final Office Action", U.S. Appl. No. 13/409,905, dated Jan. 12, 2016, 21 pages.
"Non-Final Office Action", U.S. Appl. No. 13/090,474, dated Apr. 8, 2015, 11 pages.
"Notice of Allowance", U.S. Appl. No. 13/340,702, dated Mar. 24, 2015, 12 Pages.
"Final Office Action", U.S. Appl. No. 13/409,995, dated Apr. 14, 2015, 17 Pages.
"Final Office Action", U.S. Appl. No. 13/918,818, dated Jun. 3, 2015, 22 pages.
"Final Office Action", U.S. Appl. No. 13/918,776, dated Jun. 17, 2015, 23 pages.
"BroadCloud FamilyCenter", BroadSoft Data Sheet—retrieved from <http://www.broadsoft.com/pdf/datasheet-broadcloud-familycenter.pdf> on Dec. 13, 2011, 1 page.
"CameraLock Cydia Tweak—Add a Camera Button to Your Lockscreen Without iOS 5—iPhone & iPpd Touch", Retrieved from: https://www.youtube.com/watch?v=ECGm54OB6e0, Jun. 21, 2011, 1 page.
"Corrected Notice of Allowance", U.S. Appl. No. 13/726,097, dated Aug. 21, 2014, 2 pages.
"Corrected Notice of Allowance", U.S. Appl. No. 13/726,097, dated Oct. 1, 2014, 2 pages.
"Distracted Driving Information Clearinghouse", Retrieved from <http://www.fcc.gov/encyclopedia/distracted-driving-information-clearinghouse>, Jul. 27, 2011, 4 pages.
"EP Search Report", EP Application No. 09747072.8, dated Jan. 17, 2003, 5 Pages.
"Extended European Search Report", EP Application No. 12859600.4, dated May 13, 2015, 7 pages.
"Final Office Action", U.S. Appl. No. 12/194,213, dated Sep. 20, 2011, 11 Pages.
"Final Office Action", U.S. Appl. No. 12/897,586, dated May 22, 2013, 4 pages.
"Final Office Action", U.S. Appl. No. 12/912,456, dated Sep. 6, 2013, 22 pages.
"Final Office Action", U.S. Appl. No. 13/222,538, dated May 28, 2013, 43 pages.
"Final Office Action", U.S. Appl. No. 13/726,027, dated Jan. 5, 2015, 19 pages.
"Final Office Action", U.S. Appl. No. 13/726,043, dated Mar. 3, 2015, 19 pages.
"Final Office Action", U.S. Appl. No. 13/726,090, dated Oct. 2, 2014, 30 pages.
"Final Office Action", U.S. Appl. No. 13/726,095, dated May 8, 2015, 13 pages.
"Final Office Action", U.S. Appl. No. 13/726,099, dated May 8, 2015, 11 pages.
"Final Office Action", U.S. Appl. No. 13/726,099, dated Aug. 29, 2014, 10 pages.
"Final Office Action", U.S. Appl. No. 13/875,139, dated May 9, 2014, 15 Pages.
"Final Office Action", U.S. Appl. No. 14/686,300, dated Jul. 29, 2015, 13 pages.
"Foreign Notice of Allowance", AU Application No. 2011312743, dated Nov. 25, 2014, 2 Pages.
"Foreign Notice of Allowance", CN Application No. 200980128048.8, dated Jun. 19, 2014, 4 Pages.
"Foreign Office Action", AU Application No. 2011312743, dated Aug. 15, 2014, 4 Pages.
"Foreign Office Action", AU Application No. 2011312743, dated Jun. 20, 2014, 4 Pages.
"Foreign Office Action", CL Application No. 201300886, dated Feb. 2, 2015, 7 pages.

(56) References Cited

OTHER PUBLICATIONS

"Foreign Office Action", CL Application No. 201300886, dated May 13, 2015, 7 pages.
"Foreign Office Action", CN Application No. 200980128048.8, dated May 6, 2013, 7 Pages.
"Foreign Office Action", CN Application No. 200980128048.8, dated Dec. 2, 2013, 7 pages.
"Foreign Office Action", CN Application No. 200980128048.8, dated Dec. 19, 2012, 11 Pages.
"Foreign Office Action", CN Application No. 201110317851.5, dated May 20, 2015, 8 pages.
"Foreign Office Action", CN Application No. 201110317851.5, dated Nov. 14, 2014, 15 Pages.
"Foreign Office Action", CN Application No. 201110317851.5, dated Dec. 4, 2013, 14 pages.
"Foreign Office Action", CN Application No. 201110317851.5, dated May 8, 2014, 10 Pages.
"Foreign Office Action", EP Application 12859972.7, dated May 26, 2015, 4 pages.
"Foreign Office Action", EP Application No. 11831134.9, dated May 9, 2014, 3 Pages.
"Foreign Office Action", EP Application No. 12859485.0, dated Feb. 12, 2015, 5 pages.
"Foreign Office Action", EP Application No. 12859600.4, dated Jun. 1, 2015, 8 Pages.
"Foreign Office Action", EP Application No. 12860373.5, dated Jul. 7, 2015, 6 pages.
"Foreign Office Action", EP Application No. 12860631.6, dated Feb. 16, 2015, 5 pages.
"Foreign Office Action", JP Application No. 2013-532806, dated Jun. 10, 2015, 11 pages.
"How can I see a list of all users on the logon screen?", Retrieved from <http://superuser.com/questions/354856/how-can-i-see-a-list-of-all-users-on-the-logon-screen> on Jan. 6, 2015, Nov. 7, 2011, 2 pages.
"How can one add an image to the windows 7 login screen? A", Retrieved from <http://superuser.com/questions/470568/how-can-one-add-an-image-to-the-windows-7-login-screen > on Jan. 6, 2015., Sep. 5, 2012, 4 pages.
"iCloud: What You Need to Know", MacWorld.com—retrieved from <http://www.macworld.com/article/160380/2011/06/icloud_what_you_need_to_know.html> on Dec. 13, 2011, Jun. 8, 2011, 16 pages.
"In Case of Emergency (ICE) and smart phone with lock screens", Ars Technica OpenForum—Retrieved at: http://arstechnica.com/civis/viewtopic.php?f=20&t=1140661, Mar. 29, 2011, 8 pages.
"International Search Report and Written Opinion", Application No. PCT/US2012/071559, dated Mar. 28, 2013, 10 pages.
"International Search Report and Written Opinion", Application No. PCT/US2012/071546, dated Apr. 29, 2013, 10 pages.
"International Search Report and Written Opinion", Application No. PCT/US2011/049614, dated Mar. 26, 2012, 7 pages.
"International Search Report and Written Opinion", Application No. PCT/US2009/039509, dated Nov. 18, 2009, 8 Pages.
"International Search Report and Written Opinion", Application No. PCT/US2012/071545, dated Mar. 28, 2013, 9 pages.
"International Search Report and Written Opinion", Application No. PCT/US2012/071557, dated Mar. 28, 2013, 9 pages.
"International Search Report and Written Opinion", Application No. PCT/US2012/071555, dated Apr. 25, 2013, 9 pages.
"iPad Parental Control (restricting app access)", iPad Reviews, Jailbreak Guides; last retrieved from http://ipaded.net/ipad/parental-control/ on Feb. 29, 2012, 5 pages.
"Mobile Phone Match-Up", Retrieved at: <http://www.microsoft.com/windowsmobile/enus/meet/version-compare.mspx>, Jul. 27, 2010, 4 pages.
"Mobile Task Tracker Screen Shots", Retrieved from <http://www.mobiletasktracker.com/Screen%20Shots.html>, Jul. 13, 2011, 4 Pages.
"No Tech Panacea for Tech-Distracted Driving", http://mobile.slashdot.org/story/12/06/11/0556231/no-tech-panacea-for . . . , Dec. 6, 2011, 30 Pages.
"Non Final Office Action", U.S. Appl. No. 13/222,538, dated Feb. 14, 2013, 33 Pages.
"Non-Final Office Action", U.S. Appl. No. 12/194,213, dated Mar. 17, 2011, 11 Pages.
"Non-Final Office Action", U.S. Appl. No. 12/417,752, dated Feb. 25, 2014, 22 pages.
"Non-Final Office Action", U.S. Appl. No. 12/897,586, dated May 8, 2014, 12 pages.
"Non-Final Office Action", U.S. Appl. No. 12/897,586, dated Oct. 18, 2012, 12 pages.
"Non-Final Office Action", U.S. Appl. No. 12/912,456, dated May 29, 2013, 20 pages.
"Non-Final Office Action", U.S. Appl. No. 13/222,538, dated Oct. 11, 2013, 38 pages.
"Non-Final Office Action", U.S. Appl. No. 13/328,312, dated Aug. 6, 2013, 18 pages.
"Non-Final Office Action", U.S. Appl. No. 13/726,027, dated Jun. 24, 2014, 17 pages.
"Non-Final Office Action", U.S. Appl. No. 13/726,040, dated Jan. 28, 2015, 14 pages.
"Non-Final Office Action", U.S. Appl. No. 13/726,043, dated Sep. 11, 2014, 14 pages.
"Non-Final Office Action", U.S. Appl. No. 13/726,043, dated Oct. 8, 2015, 20 pages.
"Non-Final Office Action", U.S. Appl. No. 13/726,048, dated Dec. 9, 2014, 12 pages.
"Non-Final Office Action", U.S. Appl. No. 13/726,049, dated Jul. 7, 2015, 14 pages.
"Non-Final Office Action", U.S. Appl. No. 13/726,049, dated Dec. 4, 2014, 9 pages.
"Non-Final Office Action", U.S. Appl. No. 13/726,090, dated Jun. 23, 2015, 31 pages.
"Non-Final Office Action", U.S. Appl. No. 13/726,090, dated Jun. 24, 2014, 28 pages.
"Non-Final Office Action", U.S. Appl. No. 13/726,092, dated Feb. 12, 2015, 21 pages.
"Non-Final Office Action", U.S. Appl. No. 13/726,095, dated Jan. 5, 2015, 14 pages.
"Non-Final Office Action", U.S. Appl. No. 13/726,095, dated Aug. 15, 2014, 12 pages.
"Non-Final Office Action", U.S. Appl. No. 13/726,099, dated Jan. 7, 2015, 10 pages.
"Non-Final Office Action", U.S. Appl. No. 13/726,099, dated Mar. 18, 2014, 8 pages.
"Non-Final Office Action", U.S. Appl. No. 13/875,139, dated Oct. 3, 2013, 12 pages.
"Non-Final Office Action", U.S. Appl. No. 13/875,139, dated Oct. 24, 2014, 15 Pages.
"Non-Final Office Action", U.S. Appl. No. 14/495,418, dated Jul. 2, 2015, 18 pages.
"Non-Final Office Action", U.S. Appl. No. 14/686,300, dated Jun. 8, 2015, 11 pages.
"Notice of Allowance", U.S. Appl. No. 12/194,213, dated May 31, 2013, 11 Pages.
"Notice of Allowance", U.S. Appl. No. 12/194,213, dated Jun. 27, 2012, 16 Pages.
"Notice of Allowance", U.S. Appl. No. 12/194,213, dated Dec. 21, 2012, 13 Pages.
"Notice of Allowance", U.S. Appl. No. 12/897,586, dated Jan. 5, 2015, 7 Pages.
"Notice of Allowance", U.S. Appl. No. 12/897,586, dated Oct. 15, 2014, 13 Pages.
"Notice of Allowance", U.S. Appl. No. 13/726,043, dated May 4, 2016, 15 pages.
"Notice of Allowance", U.S. Appl. No. 13/726,095, dated Aug. 28, 2015, 6 pages.
"Notice of Allowance", U.S. Appl. No. 13/726,097, dated Jun. 10, 2014, 7 pages.
"Notice of Allowance", U.S. Appl. No. 13/875,139, dated Mar. 5, 2015, 7 pages.

(56) References Cited

OTHER PUBLICATIONS

"Parental Control Software for Cell Phones", retrieved from <http://www.parentalcontrolcellphones.com/> on Dec. 8, 2011, Apr. 30, 2010, 5 pages.

"Restrict Access to Applications using AppLocker", Retrieved from: <http://www.dq.winsila.com/tips-tricks/restrict-access-to-applications-using-applocker.html> on Feb. 13, 2012, Jan. 5, 2012, 2 pages.

"Restrict Access to Programs with AppLocker in Windows 7", Retrieved from <http://www.howtogeek.com/howto/6317/block-users-from-using-certain-applications-with-applocked> on Jan. 6, 2015., Nov. 12, 2009, 9 pages.

"Restriction Requirement", U.S. Appl. No. 13/726,048, dated Jun. 20, 2014, 5 pages.

"Restriction Requirement", U.S. Appl. No. 13/726,049, dated Jul. 1, 2014, 6 pages.

"Restriction Requirement", U.S. Appl. No. 13/726,097, dated Mar. 21, 2014, 7 pages.

"Safe Driving System", Retrieved from <http://web.archive.org/web/20100512220953/http://key2safedriving.com/>, May 12, 2010, 2 pages.

"Setting up and Using Smart Unlock on the Samsung Jet", Retrieved at: <http://www.knowyourmobile.com/samsung/samsungjet/samsungjetuserguides/317988/setting_up_and_using_smatunlock_on_the_samsung_jet.html>, Jun. 20, 2010, 2 pages.

"Setting Up Simple Restricted Access", Retrieved at: http://support.webvanta.com/support_article/615777-setting-up-simple-restricted-access—on Feb. 29, 2012, 3 Pages.

"Supplemental Notice of Allowance", U.S. Appl. No. 12/897,586, dated Mar. 3, 2015, 2 Pages.

"Supplementary European Search Report", EP Application No. 12859485.0, dated Jan. 23, 2015, 4 pages.

"Supplementary European Search Report", EP Application No. 12859972.7, dated Apr. 30, 2015, 3 pages.

"Supplementary European Search Report", EP Application No. 12860373.5, dated Jun. 25, 2015, 3 pages.

"Supplementary European Search Report", EP Application No. 12860631.6, dated Jan. 5, 2015, 3 pages.

"Supplementary Search Report", EP Application No. 11831134.9, dated Apr. 3, 2014, 3 pages.

"Timeline of Microsoft Windows", Retrieved from <http://en.wikipedia.org/wiki/Timeline_of_Microsoft_Windows> on Jan. 6, 2015, Dec. 14, 2014, 5 pages.

"T-Mobile G1 Google Android Phone—Gesture Unlocking", Retrieved at: <http://www.gadgetuniversegift.com/?p=2121>, Jun. 20, 2010, 2 pages.

"T-Mobile G1 User Manual", pp. 102-103, May 27, 2009, 5 pages.

"Welcome to Sprint Drive First", Retrieved at <<https://drivefirst.sprint.com/welcome.htm>> on Nov. 20, 2013, 2013, 2 pages.

"Your Very Own Support Geek", retrieved from <http://yoursupportgeek.info/miscellaneous-geek-stuff/t-mobile-uk-to-offer-icd-vega-15-inch-tegra-android-tablet-in-2010> on Dec. 13, 2011, Jan. 7, 2010, 2 pages.

Aventail,"Aventail and Trust Digital Launch Integrated Secure Mobile Access Solution", http://findarticles.com/p/articles/mi_pwwi/is_200602/ai_n16063742/?tag=content;col1, Last accessed May 14, 2008, Feb. 2006, 3 Pages.

Bhandari,"Full Touchscreen Samsung Star (S5233), Star 3G (S5603) and BEAT DJ Launced in India", Retrieved at: http://www.tecfre.com/full-touchscreen-samsung-star-s5233-star-3g-s5603-and-beat-dj-launched-in-india/, May 11, 2009, 12 pages.

Bilderbeek,"From Unified to Social Communications and Collaboration", retrieved from <http://www.themetisfiles.com/2011/10/from-unified-to-social-communications-and-collaboration/> on Dec. 13, 2011, Oct. 25, 2011, 4 pages.

Branscombe,"Kids Corner and Wallet", Retrieved from <http://www.techradar.com/reviews/pc-mac/software/operating-systems/windows-phone-8-1086692/review/6>, Jan. 25, 2012, 7 pages.

Campbell,"Biometrically Enhanced Software-Defined Radios", Proc. Software Defined Radio Technical Conf, Orlando, Florida, Nov. 2003, 6 Pages.

Chen,"Here's the Google Phone Apple Wants You to Have", Retrieved at: http://www.wired.com/2010/03/apple-htc-google/, Mar. 5, 2010, 9 pages.

Ciprian,"Manage User Accounts", Retrieved at: http://www.vista4beginners.com/Manage-User-Accounts, May 8, 2007, 13 pages.

Covington,"Parameterized Authentication", Proc. 9th European Symposium on Research Computer Security, Lecture notes in Computer Science, Sep. 2004, 18 Pages.

Cui,"Facilitating Consumption of Online Social Networking Services on Mobile Devices", Proceedings of the 13th international conference on Ubiquitous Computing, Sep. 17, 2011, 4 Pages.

Davies,"T-Mobile UK to Offer ICD Vega 15-inch Tegra Android Tablet in 2010", Retrieved from <http://www.slashgear.com/t-mobile-uk-to-offer-icd-vega-15-inch-tegra-android-tablet-in-2010-0768671/> on Mar. 11, 2013, Jan. 7, 2010, 7 pages.

DiPane,"Sprint to Bring Parental Locks to Android Phones to Prevent Use While Driving", retrieved from <http://www.androidcentral.com/sprint-bring-parental-locks-android-phones-prevent-use-while-driving> on Dec. 8, 2011, Mar. 22, 2011, 7 pages.

Hoffmann,"Multilateral Security in Mobile Applications and Location Based Services", https://users.cs.jmu.edu/bernstdh/web/CS685/papers/hoffman-et-al-2002.pdf, Last accessed May 14, 2008, 2002, 18 Pages.

Jagadeesan,"A Novel Approach to Design of User Re-Authentication Systems", Proc. 3rd IEEE Intl. Conf. on Biometrics: Theory, Applications and Systems, Sep. 2009, 6 Pages.

Kharif,"Parental Controls for Mobile Phones? You Bet", Tech Beat, retrieved from <http://www.businessweek.com/the_thread/techbeat/archives/2005/08/parental_contro.html> on Dec. 8, 2011, Aug. 16, 2005, 12 pages.

King,"Mobile Device Child Share", U.S. Appl. No. 13/726,095, Mar. 21, 2013, 57 Pages.

Klosterman,"Secure Continuous Biometric-Enhanced Authentication", Technical Report, May 2000, May 2000, 25 Pages.

Kottahachchi,"Access Controls for Intelligent Environments", In: Proceedings of ISDA '04: 4th Annual International Conference on Intelligent Systems Design and Applications. Budapest, Hungary (2004), 2004, 6 Pages.

LeBlanc,"The Device Experience in Windows 7—Updated", Windows 7 Team Blog, retrieved from <http://windowsteamblog.com/windows/archive/b/windows7/archive/2009/09/01/the-device-experience-in-windows-7-updated.aspx> on Dec. 13, 2011, Sep. 1, 2009, 14 pages.

Lifehacker,"Get the Most Out of Your iPhone's Notification Center, from Beginner to Jailbreaker", Available online at <http://lifehacker.com/5882947/get-the-most-out-of-ios-Ss-notification-center-frombeginner-to-jailbreakerl>, retrieved on Jul. 29, 2014, Feb. 7, 2012, 8 pages.

Liu,"xShare: Supporting Impromptu Sharing of Mobile Phones", In Proceedings of the 7th international conference on Mobile systems, applications, and services, Jun. 22, 2009, pp. 15-28.

McGlaun,"Fixes for Distracted Driving Remain Unclear", http://www.dailytech.com/article.aspx?newsid=24903, Jun. 12, 2012, 2 Pages.

Moran,"Getting Started with Windows 7", 2009, 412 pages.

Mui,"The Lifesaving Smartphone Feature That We Need: Driving Mode", Retrieved from <http://www.forbes.com/sites/chunkamui/2011/12/19/the-smart-phone-feature-that-we-need-driving-mode/>, Dec. 19, 2011, 4 pages.

Nasar,"Mobile Telephones, Distracted Attention, and Pedestrian Safety", Accident Analysis & Prevention, retrieved from <http://facweb.knowlton.ohiostate.edu/jnasar/crpinfo/research/MobilePhones_AAP_2007.pdf> on Dec. 8, 2011, Jan. 2008, pp. 69-75.

Niino,"There was free enterprise microblogging, Japanese were developed "youRoom!" Free plan upgrade just mutter", Retrieved from <http://www.publickey1.jp/blog/10/youroom.html>, Dec. 21, 2010, 4 Pages.

(56) References Cited

OTHER PUBLICATIONS

OSXDaily,"How to Use the lock Screen Camera in iOS 5.1", Available online at <http://osxdaily.com/2012/03/08/lock-screen-camera-ios-5-1>, retrieved on Jul. 29, 2014, Mar. 8, 2012, 10 pages.
Patten,"Using Mobile Telephones: Cognitive Workload and Attention Resource Allocation", Accident Analysis and Prevention, retrieved from <http://beta.nsc.org/safety_road/Distracted_Driving/Documents/Using%20mobile%20telephones,%20cognitive%20workload%20and%20attention%20resource%20allocation.pdf> on Dec. 8, 2011, May 2004, pp. 341-350.
Quick,"BizzTrust for Android splits a single smartphone into two virtual phones", http://www.gizmag.com/bizztrust-for-android/20114/, Retrieved on Jan. 10, 2012, Oct. 2011, 4 Pages.
Raja,"How to Replace and Customize Android Lock Screen [Guide]", Retrieved at: http://www.addictivetips.com/mobile/how-to-replace-and-customize-android-lock-screen-guide/, Jun. 10, 2011, 14 pages.
Saenz,"Unlock Your Door with Your Phone, Text a Key to a Friend—Lockitron is Awesome (video)", Retrieved from: <http://singularityhub.com/2011/05/24/unlock-your-door-with-your-phone-text-a-key-to-a-friend-lockitron-is-awesome-video/> on Feb. 10, 2012, May 24, 2011, 3 pages.
Samberg,"Stay Focused While Driving", Retrieved from <<http://www.verizonwireless.com/news/2012/09/safely-go-driving-app.html>> on Nov. 20, 2013, Sep. 13, 2012, 5 pages.
Simonite,"One Smart Phone, Two Personalities", http://www.technologyreview.com/communications/38865/, Retrieved Jan. 10, 2012, Oct. 13, 2011, 3 Pages.
Stajano,"One user, many hats; and, sometimes, no hat?towards a secure yet usable pda", Security Protocols Workshop, Springer Verlag, 2004, 14 Pages.
Talbot,"App Battles Driver Distraction but Spares Passengers", Technology Review India published by MIT, http://www.technologyreview.in/news/426889/app-battles-driver-distraction-but-spares-passengers, Feb. 14, 2012, 2 pages.
Temporale,"Removing Application Lock on Windows Mobile Standard Devices", http://www.mobilejaw.com/articles/2009/09/removing-application-lock-on-windows-mobile-standard-devices/, Retrieved on Oct. 13, 2011, Sep. 4, 2009, 10 Pages.
Tiemann,"AT&T Adds Parental Control Options to Cell Phones", CNET News—retrieved from <http://news.cnet.com/8301-13507_3-9770506-18.html> on Dec. 8, 2011, Sep. 7, 2007, 1 pages.
Warren,"Microsoft Flaunts Metro Style PowerPoint Live Tiles", WinRumors—retrieved from <http://www.winrumors.com/microsoft-flaunts-metro-style-powerpoint-live-tiles-video/> on Dec. 13, 2011, Jul. 11, 2011, 12 pages.
Weilenmann,"Local Use and Sharing of Mobile Phones", In B. Brown, N. Green & R. Harper (Eds.) Wireless World: Social and Interactional Aspects of the Mobile Age. Godalming and Hiedleburg: Springer Verlag, 2001, pp. 99-115.
Williams,"AT&T Drive Mode, The Anti-Texting While Driving Mobile Solution (video)", Retrieved from <http://www.talkandroid.com/66579-att-drive-mode-the-anti-texting-while-driving-mobile-solution-video/>, Oct. 13, 2011, 6 pages.
Wood,"Hey, Phone Makers: Where's 'Driving Mode'?", Retrieved from <http://news.cnet.com/8301-31322_3-20003824-256.html>, Apr. 29, 2010, 3 pages.
Zaplata,"Context-based Cooperation in Mobile Business Environments—Managing the Distributed Execution of Mobile Processes", Business & Information Systems Engineering, Apr. 2009, pp. 301-314.
"Advisory Action", U.S. Appl. No. 13/919,479, dated Dec. 31, 2015, 3 pages.
"Extended European Search Report", EP Application No. 12883789.5, dated Apr. 22, 2016, 7 pages.
"Final Office Action", U.S. Appl. No. 13/919,479, dated Aug. 13, 2015, 18 pages.

"Finally, A Location-Sharing App That's Less Creepy Than Foursquare", Retrieved at: http://www.fastcodesign.com/1670275/finally-a-location-sharing-app-thats-less-creepy-than-foursquare, Jul. 11, 2012, 8 pages.
"Find My Friends app goes live ahead of iOS 5 release", Retrieved at: http://9to5mac.com/2011/10/12/find-my-friends-app-goes-live-ahead-of-ios-5-release/, Oct. 12, 2011, 10 pages.
"Foreign Office Action", CN Application No. 201210592889.8, dated Mar. 11, 2016, 8 pages.
"Non-Final Office Action", U.S. Appl. No. 13/918,818, dated May 5, 2016, 25 pages.
"Non-Final Office Action", U.S. Appl. No. 13/919,479, dated Jan. 2, 2015, 13 pages.
"Non-Final Office Action", U.S. Appl. No. 13/919,479, dated Feb. 3, 2015, 15 pages.
"Non-Final Office Action", U.S. Appl. No. 13/919,479, dated May 3, 2016, 8 pages.
Brian,"Space-time for iOS: The simple app that lets you request a person's location regardless of their smartphone", Retrieved at: http://thenextweb.com/apple/2012/04/20/spacetime-for-ios-the-simple-app-that-lets-you-request-a-persons-location-regardless-of-their-smartphone/#gref, Apr. 20, 2012, 7 pages.
Nagpal,"We're In, Location Sharing App from Microsoft Released for WP7", Available at: http://www.igyaan.in/15078/in-location-sharing-app-microsoft-released-wp7/, Aug. 19, 2011, 13 pages.
Webster,"Location sharing app Glympse gets major update", Retrieved at: http://www.androidguys.com/2012/10/16/location-sharing-app-glympse-gets-major-update/, Oct. 16, 2012, 5 pages.
"Final Office Action", U.S. Appl. No. 13/919,479, dated Jan. 6, 2017, 16 pages.
"Foreign Notice of Allowance", JP Application No. 2015-529778, dated Nov. 22, 2016, 4 pages.
"Foreign Office Action", JP Application No. 2014-550338, dated Nov. 22, 2016, 5 pages.
"Foreign Office Action", TW Application No. 102127829, dated Nov. 16, 2016, 10 pages.
"Non-Final Office Action", U.S. Appl. No. 13/918,818, dated Dec. 19, 2016, 7 pages.
"XP User Starting to Use Windows 7", http://download.Microsoft.com/download/A/0/D/A0D4CF2B-9B70-4846-A18D-0765D1F75343/XPUsertoWindows7.pdf, Jun. 13, 2010, 9 pages.
"Foreign Notice of Allowance", RU Application No. 2015153190, dated Nov. 14, 2017, 15 pages.
"Foreign Office Action", AU Application No. 2013392103, dated Nov. 14, 2017, 3 pages.
"Foreign Office Action", AU Application No. 2013392105, dated Jan. 11, 2018, 4 pages.
"Foreign Office Action", AU Application No. 2013392105, dated Nov. 17, 2017, 4 pages.
"Foreign Office Action", JP Application No. 2016-519490, dated Oct. 24, 2017, 4 pages.
"Notice of Allowance", U.S. Appl. No. 13/919,479, dated Oct. 31, 2017, 10 pages.
"Final Office Action", U.S. Appl. No. 13/090,474, filed Aug. 26, 2016, 15 pages.
"Foreign Notice of Allowance", CN Application No. 201210592889.8, Aug. 18, 2016, 4 pages.
"Notice of Allowance", U.S. Appl. No. 13/726,043, dated Aug. 16, 2016, 8 pages.
"Corrected Notice of Allowance", U.S. Appl. No. 13/918,818, dated Aug. 24, 2017, 2 pages.
"Foreign Notice of Allowance", RU Application No. 2015153200, dated Jul. 20, 2017, 17 pages.
"Foreign Office Action", AU Application No. 2013392105, dated Sep. 18, 2017, 3 pages.
"Foreign Office Action", EP Application No. 12883789.5, dated Aug. 29, 2017, 5 pages.
"Foreign Office Action", EP Application No. 2013392103, dated Sep. 18, 2017, 3 pages.
"Foreign Office Action", JP Application No. 2016-519492, dated Jun. 27, 2017, 17 pages.
"Foreign Office Action", RU Application No. 2015153190, dated Aug. 21, 2017, 16 pages.

(56) References Cited

OTHER PUBLICATIONS

"Advisory Action", U.S. Appl. No. 13/919,479, dated May 31, 2017, 6 pages.
"Foreign Office Action", RU Application No. 2015153200, dated Apr. 25, 2017, 8 pages.
"Notice of Allowance", U.S. Appl. No. 13/918,818, dated Jun. 19, 2017, 8 pages.
"Final Office Action", U.S. Appl. No. 13/918,818, dated Apr. 6, 2017, 6 pages.
"Non-Final Office Action", U.S. Appl. No. 15/216,552, dated Mar. 29, 2017, 19 pages.
"Notice of Allowance", U.S. Appl. No. 13/726,043, dated Mar. 17, 2017, 15 pages.
"Notice of Allowance", U.S. Appl. No. 13/726,043, dated May 19, 2017, 8 pages.
"Notice of Allowance", U.S. Appl. No. 15/143,731, dated Apr. 27, 2017, 7 pages.
"Office Action Issued in Mexican Patent Application No. MX/a/2015/017182", dated Dec. 8, 2017, 5 Pages.
"Foreign Office Action", CN Application No. 201380077448.7, Apr. 4, 2018, 8 pages.

\* cited by examiner

| Geo-fence Radius | Position Uncertainty Radius | | | | | | | |
|---|---|---|---|---|---|---|---|---|
| | GPS (10m) | Wi-Fi (50m) | Wi-Fi (100m) | Multi Cell (500m) | Cell (2,000m) | Cell (3,000m) | IP (40,000m) |
| Bus Stop (5m) | 14.58 | 2.59 | 1.23 | N/A | N/A | N/A | N/A |
| Coffee Shop (10m) | 30.70 | 5.45 | 2.59 | N/A | N/A | N/A | N/A |
| Building (100m) | 100.00 | 64.65 | 30.70 | 5.45 | 1.23 | N/A | N/A |
| Mall (500m) | 100.00 | 100.00 | 100.00 | 30.70 | 6.93 | 4.48 | N/A |
| Neighborhood (2,000m) | 100.00 | 100.00 | 100.00 | 100.00 | 30.70 | 19.86 | 1.23 |
| City (10,000m) | 100.00 | 100.00 | 100.00 | 100.00 | 100.00 | 100.00 | 6.93 |

| Radius Range | Example | Desired Accuracy | Acceptable Error Radius |
|---|---|---|---|
| 5m or less | Bus Stop, Small Store | 50m | 80m |
| 10m or less | Home | 50m | 80m |
| 15m or less | Medium Store | 60m | 100m |
| 35m or less | Large Store | 70m | 100m |
| 50m or less | Super Store, Small Mall | 2 X Fence Radius | 150m |
| 65m or less | Stadium | 2 X Fence Radius | 175m |
| 80m or less | School, City Block, Workplace | 2 X Fence Radius | 200m |
| 100m or less | Airport | 2 X Fence Radius | 250m |
| 250m or less | Medium Mall | 2 X Fence Radius | 500m |
| 500m or less | Large Mall, Medium Neighborhood | 500m | 1000m |
| 1000m or less | City Area | Fence Radius | 1000m |
| Above 1000m |  | Fence Radius | Fence Radius |

DETECTING GEO-FENCE EVENTS USING VARYING CONFIDENCE LEVELS

BACKGROUND

As computing technology has advanced, increasingly powerful mobile devices have become available. For example, smart phones have become commonplace. The mobility of such devices has resulted in different types of functionality being developed, such as location-based functionality in which certain actions are taken by the device based on the location of the device. While this functionality has many benefits, it is not without its problems. One such problem is that it remains difficult to determine an exact location of a device. This can lead to situations in which particular actions that should be taken based on the location of the device are not taken, and/or situations in which particular actions should not be taken based on the location of the device are actually taken, leading to user frustration and a poor user experience when using the device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a size of a geo-fence (e.g., an area of interest) is identified. A size of a position uncertainty area for a location determination module is also identified, the position uncertainty area being based on an estimated accuracy error of a location for a computing device provided by the location determination module. The occurrence of one or more geo-fence events for the geo-fence (e.g., entering the geo-fence, exiting the geo-fence, staying in the geo-fence for a particular amount of time, etc.) is determined based on a confidence level that varies based at least in part on both the size of the geo-fence and the size of the position uncertainty area.

In accordance with one or more aspects, a computing device includes a data store, one or more location determination modules, and a geo-fence event detection module. The data store is configured to store geo-fence data for multiple geo-fences, the geo-fence data for each geo-fence identifying an area of the geo-fence. The one or more location determination modules are each configured to provide a location of the computing device, the location of the computing device having an associated position uncertainty area. The geo-fence event detection module detects the occurrence of one or more geo-fence events for at least one of the multiple geo-fences based on a confidence level that varies based at least in part on a size of at least one of the multiple geo-fences and on the size of the position uncertainty area.

BRIEF DESCRIPTION OF THE DRAWINGS

The same numbers are used throughout the drawings to reference like features.

FIG. 8 illustrates an example table showing an example confidence that can be achieved given a geo-fence and different location determination modules in accordance with one or more embodiments.

FIG. 10 illustrates an example table that indicates the desired location accuracy for different geo-fence sizes in accordance with one or more embodiments.

DETAILED DESCRIPTION

Detecting geo-fence events using varying confidence levels is discussed herein. The location of a computing device is determined, and the location of an area of interest is identified. The area of interest is a geographic area that is also referred to as a geo-fence. The accuracy of the determined location of the computing device has an associated uncertainty, so the exact position of the computing device cannot typically be pinpointed. In light of this uncertainty, the uncertainty associated with the determined location is evaluated relative to the size of the geo-fence in order to determine whether the computing device is inside the geo-fence or outside the geo-fence. Based on this determination, various actions can be taken if the user is entering the geo-fence, exiting the geo-fence, remaining in the geo-fence for at least a threshold amount of time, and so forth.

The determination of whether the computing device is inside the geo-fence or outside the geo-fence is made by varying a confidence level based at least in part on the size of the geo-fence. The confidence level that is varied can take various forms, such as a threshold confidence value that is based on a proportion of the geo-fence area to the position uncertainty area, or how much error in accuracy of a location determination module is acceptable for the geo-fence area (and thus how much confidence there is in the determination of whether the computing device is inside or outside the geo-fence). By varying the confidence level, the determination of whether the computing device is inside or outside the geo-fence adapts to geo-fences of different sizes, allowing false alarms (situations where the computing device is incorrectly determined to be inside a geo-fence) to be reduced as well as allowing missed geo-fences (situations where the computing device is incorrectly determined to be outside a geo-fence) to be reduced.

Figure 1:
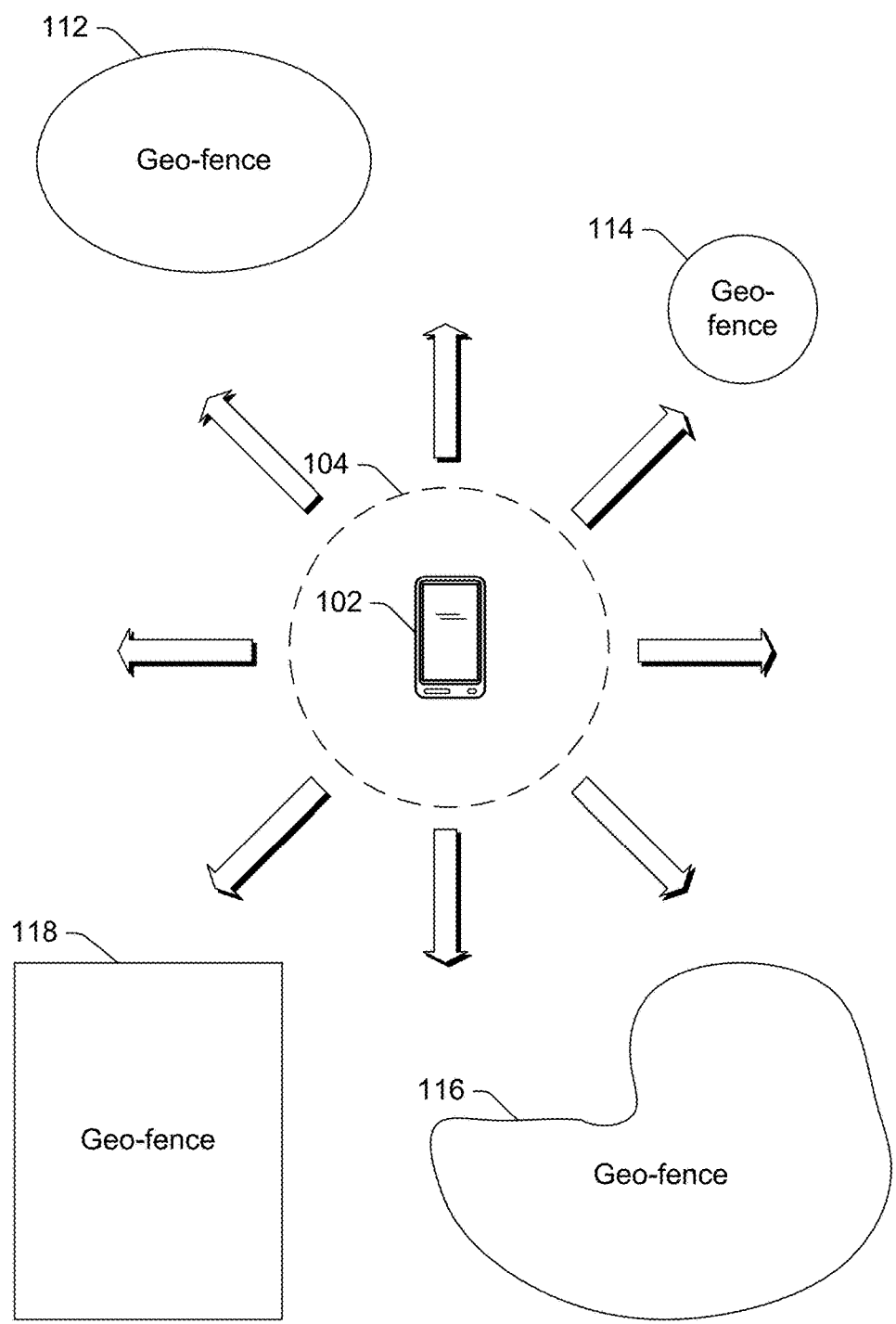
FIG. 1 illustrates an example system in which the detecting geo-fence events using varying confidence levels discussed herein can be used.

FIG. 1 illustrates an example system 100 in which the detecting geo-fence events using varying confidence levels discussed herein can be used. The system 100 includes a computing device 102, which can be any of a variety of types of devices, although typically is a mobile device. For example, the computing device 102 can be a smart phone or other wireless phone, a laptop or netbook computer, a tablet or notepad computer, a wearable computer, a mobile station, an entertainment appliance, an audio and/or video playback device, a game console, an automotive computer, and so forth. The computing device 102 is typically referred to as being a mobile device because the device 102 is designed or intended to be moved to multiple different locations (e.g., taken by a user with him or her as the user goes to different locations).

The location of the computing device 102 can be determined using any of a variety of different techniques, such as wireless networking (e.g., Wi-Fi) triangulation, cellular positioning, Global Navigation Satellite System (GNSS) positioning, network address (e.g., Internet Protocol (IP) address) positioning, and so forth as discussed in more detail below. Different location determination techniques can have different accuracy errors or associated uncertainties. For example, a location determination technique may be accurate to 10 meters (m) or 10 kilometers (km). The exact position of the computing device 102 is thus not pinpointed, but is illustrated as an area 104 surrounding the computing device 102. The area 104 represents the uncertainty in the determined location or position of the computing device 102, so although the computing device is determined to be at a particular location or position (e.g., approximately the center of the area 104), the computing device 102 may actually be anywhere within the area 104.

The system 100 also illustrates multiple geo-fences 112, 114, 116, and 118. Each geo-fence 112-118 can be any of a variety of different places of interest to the computing device 102, to the user of the computing device 102, to a program running on the computing device 102, and so forth. For example, a geo-fence 112-118 can be the user's home, the user's workplace, restaurants or businesses that may be visited by the user, educational facilities, public services (e.g., hospitals or libraries), geographic places (e.g., cities or states), and so forth.

The location of geo-fences 112-118 is maintained in or otherwise accessible to the computing device 102. It should be noted that different users of the computing device 102 can optionally have different geo-fences maintained or accessed. The computing device 102 is mobile and can enter and exit geo-fences 112-118. At any given time, the computing device 102 can be within one of geo-fences 112-118, or within no geo-fence. If the computing device 102 is determined to be within the area that encompasses a particular geo-fence, then the computing device 102 is referred to as being inside or within that particular geo-fence. However, if the computing device 102 is determined to not be within the area that encompasses a particular geo-fence, then the computing device 102 is referred to as being outside or not within that particular geo-fence. Situations can also arise in which two or more geo-fences overlap, in which case the computing device 102 can be within two or more geo-fences 112-118 at one time. It should be noted that the illustration of FIG. 1 is not to scale, and that geo-fences 112-118 can be, and typically are, significantly larger in size than the computing device 102.

In the illustrated example, the area 104 does not intersect any of the geo-fences 112-118, and thus the computing device 102 is outside each of the geo-fences 112-118. However, if the area 104 were to at least partially overlap one of the geo-fences 112-118, then the computing device 102 is possibly inside the geo-fence that is overlapped. Whether the computing device 102 is determined to be inside the geo-fence or outside the geo-fence in such situations is determined based on varying confidence levels, as discussed in more detail below.

Figure 2:
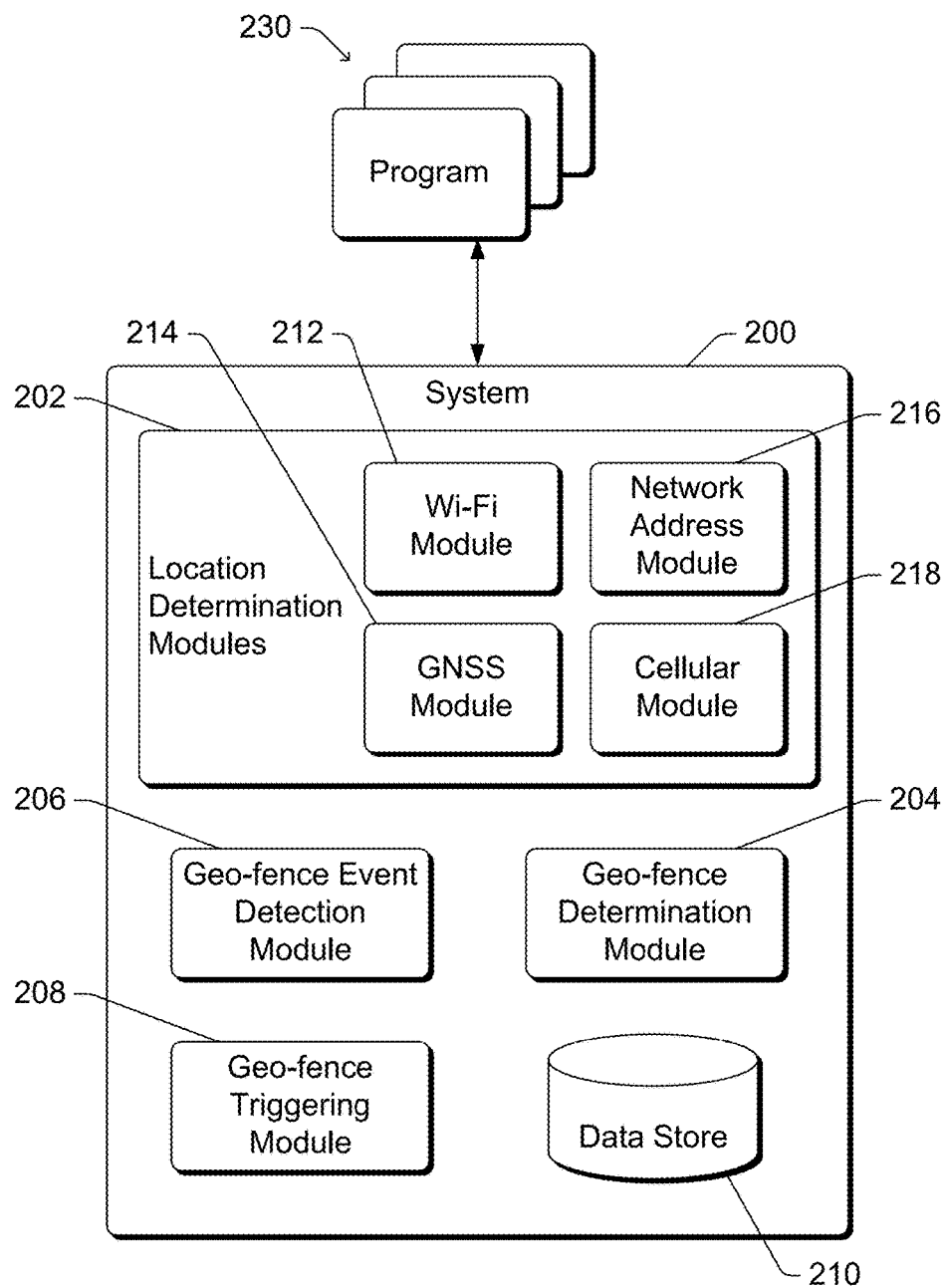
FIG. 2 is a block diagram illustrating an example system implementing the detecting geo-fence events using varying confidence levels in accordance with one or more embodiments.

FIG. 2 is a block diagram illustrating an example system 200 implementing the detecting geo-fence events using varying confidence levels in accordance with one or more embodiments. The system 200 can be implemented by a single device such as the computing device 102 of FIG. 1, or alternatively multiple devices such as the computing device 102 and one or more server computers accessed via a network (e.g., a cellular or other wireless phone network, the Internet, etc.). The system 200 includes one or more location determination modules 202, a geo-fence determination module 204, a geo-fence event detection module 206, a geo-fence triggering module 208, and a data store 210.

The data store 210 maintains various data used by the techniques discussed herein. The data store 210 can be implemented using any of a variety of different storage devices, such as system memory (e.g., random access memory (RAM)), Flash memory or other solid state memory, magnetic disks, optical discs, and so forth. The data maintained in the data store 210 identifies multiple geo-fences, including geo-fence data for each of multiple geo-fences. Geo-fence data can be obtained from various sources, such as from a distributor or reseller of the data store 210 that stores the data on the data store 210, from a program running on a computing device implementing the system 200, from another device or service, and so forth. The geo-fence data for a geo-fence describes the boundary of the geo-fence (including an indication of the shape of the geo-fence), as well as the criteria to be satisfied in order for the geo-fence to be triggered.

The criteria to be satisfied can refer to a device entering the geo-fence, exiting the geo-fence, staying within the geo-fence for a particular amount of time (e.g., at least a threshold amount of time, no more than a threshold amount of time, etc.), a time period for the geo-fence (e.g., a start time and end time, a start time and a duration), combinations thereof, and so forth. One or more actions that are taken in response to the geo-fence being triggered (the criteria being satisfied) can also be included as part of the geo-fence data. Any of a variety of actions can be taken when a geo-fence is triggered, such as a particular program being notified, particular content being displayed or otherwise played back by the computing device, the geo-fence data being deleted from the data store 210, combinations thereof, and so forth. Multiple different actions can be taken based on the manner in which the geo-fence is triggered, such as one action taken in response to the device entering the geo-fence, and another action taken in response to the device exiting the geo-fence.

The boundary of the geo-fence can be specified in any of a variety of different manners. For example, the geo-fence can be specified as a position (e.g., latitude and longitude coordinates) and a radius, as a set of positions (e.g., latitude and longitude coordinates of corners of the geo-fence), as a series of vectors, and so forth. In the discussions herein, reference is made to the geo-fences being approximately circular in shape. However, it should be noted that the geo-fences can be any of a variety of regular geometric shapes (e.g., triangles, rectangles, octagons, and so forth), other geometric shapes (e.g., freeform shapes or blobs), and so forth.

The data store 210 is illustrated in FIG. 2 as being part of the system 200. It should be noted that the data maintained in the data store 210 can be obtained from the programs 230

(e.g., from the programs 230 as they are loaded in a computing device implementing the system 200). Alternatively, one or more of the programs 230 can include a data store that is used in addition to, or in place of, the data store 210.

The geo-fences can be used in a variety of different manners. For example, a geo-fence and action to be taken can be to alert a user of a computing device implementing at least part of the system 200 when they are approaching a bus stop, to give the user a coupon when they enter a shopping mall or store, to notify a parent when their child has left school or entered their home, to display weather information for a current location when the user travels to a different city, and so forth.

The location determination modules 202 include one or more modules that determine the location of the computing device 102. In the illustrated example, the location determination modules 202 include a Wi-Fi module 212, a GNSS module 214, a network address module 216, and a cellular module 218. It should be noted, however, that these modules 212-218 are examples and that the location determination modules 202 need not include each of the modules 212-218 and/or that the location determination modules 202 can include one or more additional modules that determine a location of the computing device 102 in different manners. For example, the location determination modules can include MEMS (Microelectromechanical systems), cameras, microphones, and so forth.

The Wi-Fi module 212 uses Wi-Fi signals, such as triangulation of Wi-Fi signals, to determine the location of the computing device 102. The Wi-Fi module 212 can receive signals from various wireless access points, including an identifier of a particular wireless access point and/or a particular wireless network from which a signal is received. For example, a wireless access point may send a media access control (MAC) address of the wireless access point, a basic service set identifier (BSSID) of a wireless network supported by the wireless access point, and so forth. The Wi-Fi module 212 can also measure a strength (e.g., received signal strength indicator (RSSI) values) of these received signals. It should be noted that the Wi-Fi module 212 can, at any given time for any given position of the computing device, receive signals from multiple wireless access points. The Wi-Fi module 212 can maintain or otherwise access a record of wireless access points, signal strengths, and corresponding locations to determine the location of the computing device at any particular time given the wireless access points from which signals are received and the strength of those signals at the particular given time. Alternatively, the Wi-Fi module 212 can provide an indication of the wireless access points from which signals are received and the strength of those signals at a particular given time to a remote service (e.g., accessed via any of a variety of different types of networks) that determines and returns to the Wi-Fi module 212 an indication of the location of the computing device at that particular given time.

The GNSS module 214 uses GNSS positioning to determine the location of the computing device 102, determining a location of the computing device based on a particular number of satellites (e.g., four or more satellites) from which the GNSS module 214 can receive signals or otherwise communicate. The GNSS module 214 can implement the GNSS functionality using a variety of different technologies, including but not limited to the Global Positioning System (GPS), the Global Navigation Satellite System (GLONASS), the BeiDou (or Compass) navigation system, the Galileo positioning system, combinations thereof, and so forth. The GNSS module 214 operates in any of a variety of public and/or proprietary manners to determine, given the one or more satellites from which the GNSS module 214 can receive signals or otherwise communicate at any particular given time, the location of the computing device at that particular given time.

The network address module 216 uses network address positioning to determine the location of the computing device 102. The network address used can be any of a variety of network addresses, such as the IP address of the computing device. The network address module 216 can maintain or otherwise access a record of IP addresses or address ranges and corresponding locations to determine the location of the computing device at any particular time given the IP address assigned to the computing device at the particular given time. Alternatively, the network address module 216 can provide an indication of the IP address of the computing device at a particular given time to a remote service (e.g., accessed via any of a variety of different types of networks) that determines and returns to the network address module 216 an indication of the location of the computing device at that particular given time.

The cellular module 218 uses cellular positioning to determine the location of the computing device 102. The cellular module 218 can receive signals from various cell transceivers, including an identifier of a particular cell transceiver (e.g., a cell tower or transceiver identifier) from which a signal is received. The cellular module 218 can also measure a strength of these received signals. It should be noted that the cellular module 218 can, at any given time for any given position of the computing device, receive signals from multiple cell transceivers. The cellular module 218 can maintain or otherwise access a record of cell transceivers, signal strengths, and corresponding locations to determine the location of the computing device at any particular time given the cell transceivers from which signals are received and the strength of those signals at the particular given time. Alternatively, the cellular module 218 can provide an indication of the transceivers from which signals are received and the strength of those signals at a particular given time to a remote service (e.g., accessed via any of a variety of different types of networks) that determines and returns to the cellular module 218 an indication of the location of the computing device at that particular given time. Additionally or alternatively, the cellular module 218 can monitor state changes at low power and provide notifications (e.g., to the geo-fence event detection module 206), allowing movement detections at low power without requiring continuous polling.

The locations determined by the location determination modules 202 are typically latitude and longitude coordinates, although the location can alternatively be specified in other manners. Each of the location determination modules 202 has an associated uncertainty in the location that it determines, also referred to as an accuracy error or estimated accuracy error of the location. The amount of this uncertainty can be determined in various manners, such as being reported by the location determination module itself, being pre-configured in or otherwise accessible to other modules of the system 200 (e.g., the geo-fence event detection module 206), and so forth. The uncertainty results in a position uncertainty area for the location determined by a location determination module, the position uncertainty area being an area within which the computing device 102 may actually be for the determined location. In one or more embodiments, the position uncertainty area is an approximately circular area with the location determined by the location determination module being approximately the center of the circular area, and the radius of the approximately circular area being an error radius determined as the uncertainty for the location determination module. Alternatively, the position uncertainty area can be described using various other regular or other geometric shapes. Thus, a position uncertainty area for a location determination module can be a spatial error distribution function. An approximation of the spatial error distribution function can be a flat distribution over an area, although various other approximations or descriptions of the spatial error distribution function can alternatively be used.

The geo-fence determination module 204 determines one or more of the geo-fences identified in the data store 210 for which a determination is to be made as to whether the geo-fence is triggered. Data for numerous different geo-fences can be maintained in the data store 210, and one or more of those geo-fences is selected by the geo-fence determination module 204. The geo-fence determination module 204 can make this determination in a variety of different manners, such as based on a current distance between the geo-fences and the computing device, based on sizes of (areas encompassed by) the geo-fences, based on which geo-fence is most (or nearly most) stringent as discussed in more detail below, and so forth. The one or more geo-fences that are determined by the module 204 are those deemed more likely to be entered or exited based on various criteria, such as the current location of the computing device, and those one or more geo-fences can be the focus of the module 204 until the criteria changes. However, it should be noted that the geo-fence determination module 204 can determine whether a geo-fence is triggered for any of the geo-fences in the data store 210.

The geo-fence event detection module 206 obtains a current location of the computing device at regular or irregular intervals, and detects whether a geo-fence event occurs. These intervals can be selected dynamically based on current conditions (e.g., approximate distance to a closest geo-fence, power budget for the computing device, an estimated speed of movement of the computing device, and so forth). A geo-fence event refers to the device entering the geo-fence, exiting the geo-fence, or staying in the geo-fence for a particular amount of time (e.g., being in the geo-fence and not exiting the geo-fence). The geo-fence event detection module 206 evaluates the uncertainty associated with the determined location relative to the size of the geo-fence in order to determine whether the computing device is inside the geo-fence or outside the geo-fence. The geo-fence event detection module 206 also tracks whether the computing device is inside or outside the geo-fence over time, and thus knows whether the computing device has moved from inside the geo-fence to outside the geo-fence, whether the computing device has moved outside the geo-fence to inside the geo-fence, an amount of time that the computing device has been inside the geo-fence, and so forth.

The geo-fence triggering module 208 analyzes the criteria to be satisfied in order for the geo-fence to be triggered, and determines whether the criteria are satisfied. This determination is made at least in part on the occurrence of one or more geo-fence events as determined by the geo-fence event detection module 206. In response to the criteria being satisfied, the module 208 determines that the geo-fence is triggered and takes the appropriate action. The action taken can be associated with geo-fence data for the triggered geo-fence stored in the data store 210, or can be determined in other manners such as being pre-configured in the geo-fence triggering module 208, being obtained from another module or device, and so forth.

In one or more embodiments, the action taken by the geo-fence triggering module 208 in response to the geo-fence being triggered is to notify one or more programs 230. The one or more programs 230 can include various different types of programs, such as applications, operating system modules or components, and so forth. The one or more programs 230 to be notified can be identified in different manners, such as being configured in the geo-fence triggering module 208, being identified as part of the geo-fence data for the geo-fence in the data store 210, being obtained from another module or service, and so forth. A program 230 can be notified of the geo-fence event that occurred, as well as optionally additional information (e.g., that the computing device was within a geo-fence for at least a threshold amount of time). The program 230 can then take the action it desires based on the geo-fence being triggered.

Although illustrated as modules separate from the location determination modules 202, it should be noted that one or more of the modules 204-208 can alternatively be implemented at least in part in one of the location determination modules 202. For example, at least part of one or more of the modules 204-208 can be implemented in hardware components of the GNSS module 214 or the Wi-Fi module 212.

In one more embodiments, a location is determined by the location determination modules 202 only after receiving user consent to do so. This user consent can be an opt-in consent, where the user takes an affirmative action to request that the location be determined by the location determination modules 202 before any such location is determined. Alternatively, this user consent can be an opt-out consent, where the user takes an affirmative action to request that the location not be determined by the location determination modules 202. If the user does not choose to opt out of determining the location, then it is an implied consent by the user to determine his or her location. Furthermore, it should be noted that the location determined by the location determination modules 202 can be maintained in a computing device receiving the determined location (e.g., the computing device 102 of FIG. 1) and need not be communicated to other devices or services.

Alternatively, user consent may be granted for specific programs and revoked for other programs. In this case, location information will be determined only when the user has consented for at least one program for which geo-fence tracking is used. The location information is used to determine the entry and/or exit of only those geo-fences belonging to the consented programs. Remaining geo-fences from the unapproved programs are not tracked.

Figure 3:
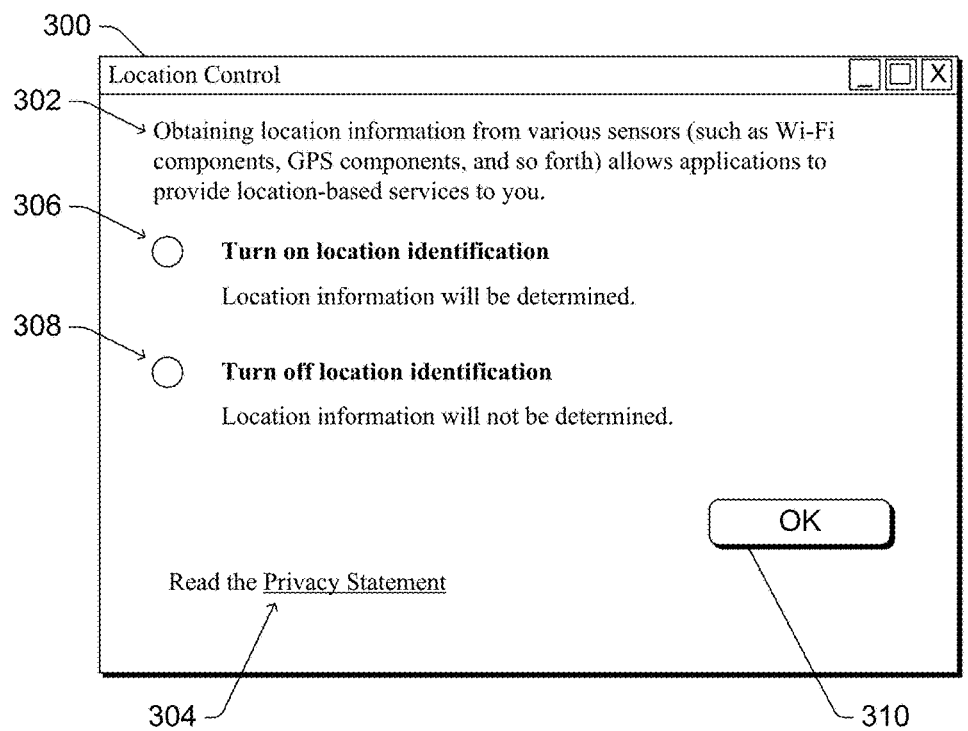
FIG. 3 illustrates an example user interface that can be displayed to a user to allow the user to select whether locations are to be determined in accordance with one or more embodiments.

FIG. 3 illustrates an example user interface that can be displayed to a user to allow the user to select whether locations are to be determined in accordance with one or more embodiments. A location control window 300 is displayed including a description 302 explaining to the user why the location information is being determined. A link 304 to a privacy statement is also displayed. If the user selects the link 304, a privacy statement of the system 200 is displayed, explaining to the user how the user's information is kept confidential.

Additionally, the user is able to select a radio button 306 to opt-in to the determining of location information, or a radio button 308 to opt-out of the determining of location information. Once a radio button 306 or 308 is selected, the user can select an "OK" button 310 to have the selection saved. It is to be appreciated that radio buttons and an "OK" button are only examples of user interfaces that can be presented to a user to opt-in or opt-out of the determining of location information, and that a variety of other conventional user interface techniques can alternatively be used. The system 200 of FIG. 2 then proceeds to determine the location of the computing device, or not determine the location of the computing device, in accordance with the user's selection.

Figure 4:
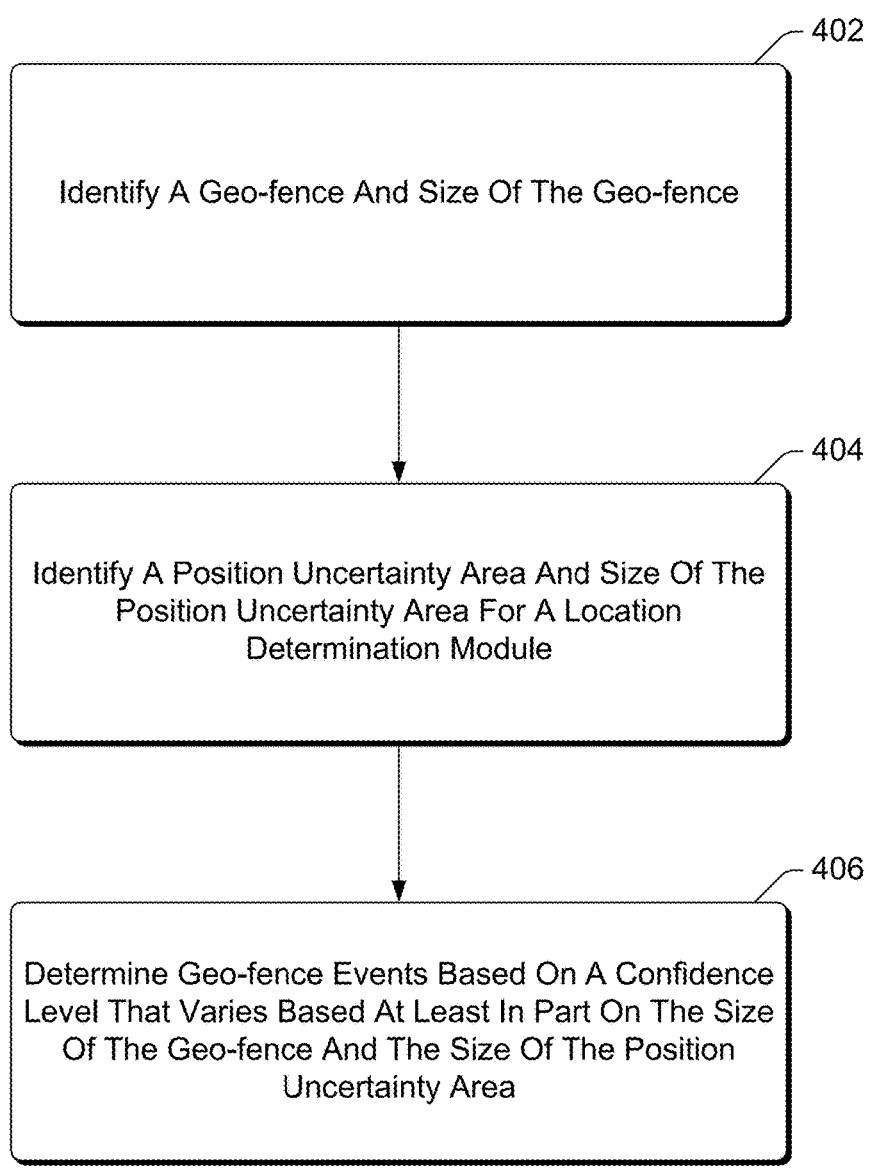
FIG. 4 is a flowchart illustrating an example process for detecting geo-fence events using varying confidence levels in accordance with one or more embodiments.

FIG. 4 is a flowchart illustrating an example process 400 for detecting geo-fence events using varying confidence levels in accordance with one or more embodiments. The process 400 is carried out by a system, such as the system 200 of FIG. 2, and can be implemented in software, firmware, hardware, or combinations thereof. The process 400 is shown as a set of acts and is not limited to the order shown for performing the operations of the various acts. The process 400 is an example process for detecting geo-fence events using varying confidence levels; additional discussions of detecting geo-fence events using varying confidence levels are included herein with reference to different figures.

In process 400, a geo-fence and its size are identified (act 402). The identified geo-fence is a geo-fence selected by the geo-fence determination module 204 of FIG. 2. The size of the geo-fence refers to the area encompassed by the geo-fence (the area within the boundary of the geo-fence), and can be identified in any of a variety of different manners. For example, the size of the geo-fence can be stored as part of the geo-fence data in the data store 210 of FIG. 2, the size of the geo-fence can be determined in act 402 based on a description of the area of the geo-fence included in the geo-fence data in the data store 210, and so forth. Various values can be readily determined given the size of the geo-fence and the shape of the boundary of the geo-fence, such as overlap between the geo-fence and a position uncertainty area for a location of a computing device.

A current position uncertainty area and its size for a location determination module is identified (act 404). The position uncertainty area can be described in various manners using different shapes, functions, and so forth as discussed above. The location determination module in act 404 is the location determination module providing the location of the computing device for purposes of determining geo-fence events for the geo-fence (the geo-fence for which the size is identified in act 402). The position uncertainty area can be identified based on the uncertainty of the location determination module determined in various manners as discussed above. The size of the position uncertainty area refers to the area encompassed by the position uncertainty area, and can be identified in any of a variety of different manners. For example, the size of the position uncertainty area can be provided by the location determination module, the size of the position uncertainty area can be determined in act 404 based on a description of the position uncertainty area, and so forth.

Geo-fence events are determined based on a confidence level that varies based at least in part on the size of the geo-fence and the size of the position uncertainty area (act 406). The confidence level can take various forms. For example, the confidence level can be a threshold confidence value that is based on a proportion of the geo-fence area to the position uncertainty area (e.g., as discussed below with reference to FIG. 5). By way of another example, the confidence level can be how much error in accuracy of a location determination module is acceptable for the geo-fence area, and thus how much confidence there is in the determination of whether the computing device is inside or outside the geo-fence, (e.g., as discussed below with reference to FIG. 9).

Figure 5:
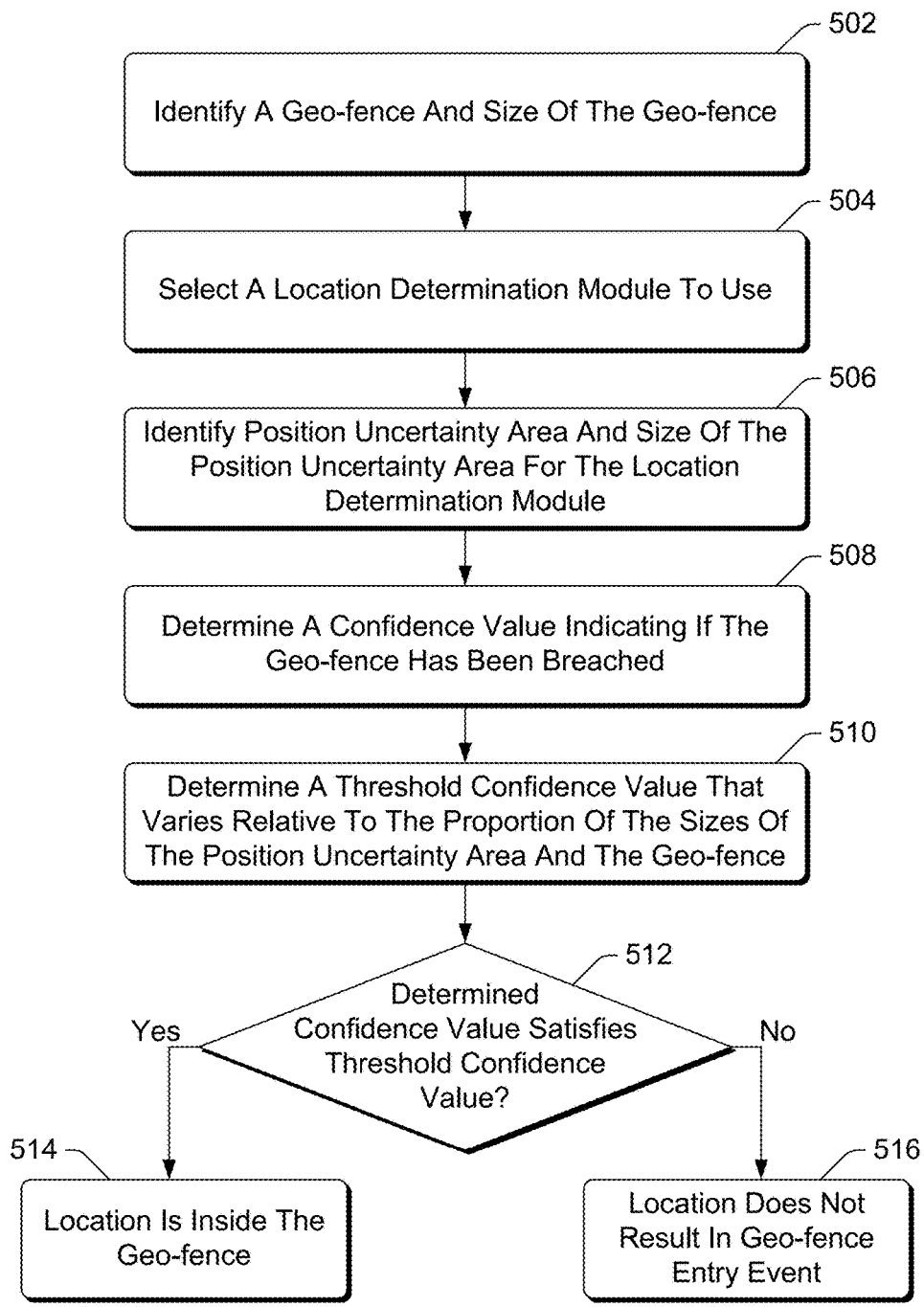
FIG. 5 is a flowchart illustrating another example process for detecting geo-fence events using varying confidence levels in accordance with one or more embodiments.

FIG. 5 is a flowchart illustrating an example process 500 for detecting geo-fence events using varying confidence levels in accordance with one or more embodiments. In the process 500, the confidence level is a threshold confidence value that is varied based on a proportion of the geo-fence area to the current position uncertainty area. As the proportion increases the threshold confidence value increases, and as the proportion decreases the threshold confidence value decreases.

The process 500 is carried out by a system, such as the system 200 of FIG. 2, and can be implemented in software, firmware, hardware, or combinations thereof. The process 500 is shown as a set of acts and is not limited to the order shown for performing the operations of the various acts. The process 500 is an example process for detecting geo-fence events using varying confidence levels; additional discussions of detecting geo-fence events using varying confidence levels are included herein with reference to different figures.

Different confidence values are discussed herein, such as an acceptable confidence value, a confidence value for a location, and a threshold confidence value. A confidence value is generated based on the area of overlap between the position uncertainty area for a location of the computing device and the geo-fence as well as on the position uncertainty area for the location of the computing device. For example, a confidence value C can be calculated using the following equation:

$$C = \frac{A_{overlap}}{A_{location}} \qquad (1)$$

where $A_{overlap}$ refers to the area of overlap between the position uncertainty area for a location of the computing device and the geo-fence, and $A_{location}$ refers to the position uncertainty area for a location of the computing device.

In process 500, a geo-fence and its size are identified (act 502). The identified geo-fence is a geo-fence selected by the geo-fence determination module, and its size can be determined in various manners analogous to the discussion above regarding act 402 of FIG. 4.

A location determination module to use is selected (act 504). The location determination module is selected based on an acceptable confidence level, which is a confidence level that the location determination module is to be able to provide in order to be selected in act 504. The acceptable confidence level can be determined in different manners, such as empirically by the designer of the system 200 of FIG. 2. The acceptable confidence level can optionally be changed, such as by a user or administrator of the system 200, by a creator of a geo-fence (e.g., identifying the acceptable confidence level in the geo-fence data for the geo-fence), and so forth. In one or more embodiments, the acceptable confidence level is 1%, although this acceptable confidence level is an example and other acceptable confidence levels can alternatively be used.

Whether a particular location determination module can provide the acceptable confidence level can be readily determined given the size of the geo-fence and the position uncertainty area for locations provided by the location determination module. For example, using equation (1) above, assuming the largest possible overlap between the position uncertainty area for locations provided by the location determination module and the geo-fence and assuming an acceptable confidence level of 1%, if the geo-fence area is 1 m² and the location determination module provides a position uncertainty area for locations of 100 m², then the confidence level provided by the location determination module would be 1%:

$$C = \frac{1}{100} = 1\%$$

and the location determination module provides the example acceptable confidence level of 1%. By way of another example, if the geo-fence area is 1 m² and the location determination module provides a position uncertainty area for locations of 4,000,000 m², then the confidence level provided by the location determination module would be 0.00000025%:

$$C = \frac{1}{4,000,00} = .00000025\%$$

and the location determination module does not provide the example acceptable confidence level of 1%.

Thus, the system 200 can dynamically switch between location determination modules based on the acceptable confidence level provided by those location determination modules and the size of the geo-fence. If a single location determination module provides the acceptable confidence level, then that single location determination module is selected in act 504. However, in situations in which multiple location determination modules provide acceptable confidence levels, one of those multiple location determination modules is selected. Which of the multiple location determination modules is selected in such situations can be determined in different manners based on various factors, such as the location determination module that consumes the smallest amount of power when operating, the location determination module that provides a location in the shortest amount of time, and so forth.

A position uncertainty area and its size for a location determination module is identified (act 506). The location determination module in act 506 is the location determination module selected in act 504. The position uncertainty area can be identified based on the uncertainty or accuracy of the location determination module determined in various manners as discussed above. The size of the position uncertainty area refers to the area encompassed by the position uncertainty area, and can be identified in any of a variety of different manners. For example, the size of the position uncertainty area can be provided by the location determination module, the size of the position uncertainty area can be determined in act 506 based on a description of the position uncertainty area, and so forth.

A confidence value for indicating if the geo-fence has been breached (the computing device has entered the geo-fence) is determined (act 508). The confidence value for the geo-fence breach condition can be determined using equation (1) above, relying on the actual overlap between the position uncertainty area for the determined location of the computing device and the geo-fence.

Figure 6:
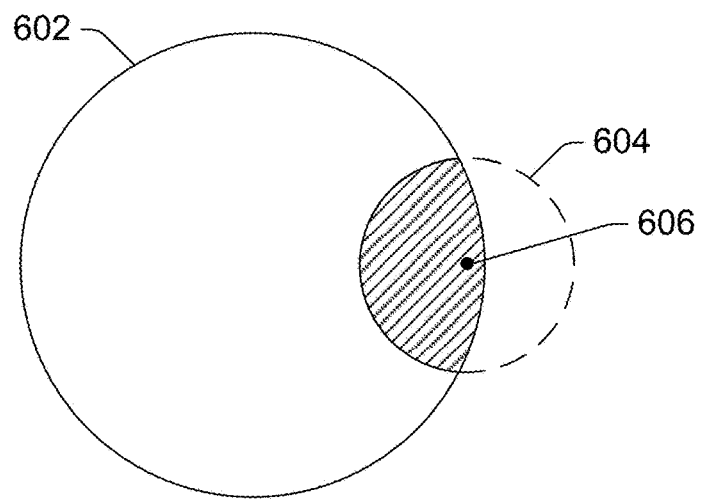
FIGS. 6 and 7 illustrate examples of overlapping position uncertainty areas and geo-fences in accordance with one or more embodiments.
Figure 7:
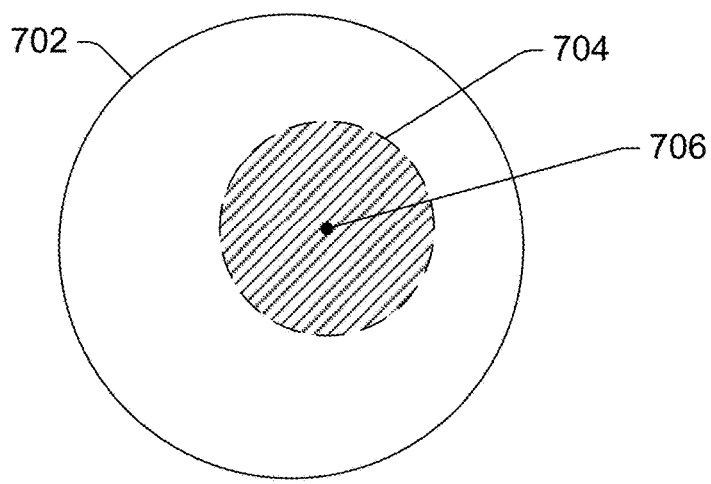

FIGS. 6 and 7 illustrate examples of overlapping position uncertainty areas and geo-fences in accordance with one or more embodiments. FIG. 6 illustrates an example geo-fence 602 and an example position uncertainty area 604 for a determined location 606. The actual overlap between the position uncertainty area 604 and the geo-fence 602 is illustrated with cross-hatching. FIG. 7 illustrates an example geo-fence 702 and an example position uncertainty area 704 for a determined location 706. The actual overlap between the position uncertainty area 704 and the geo-fence 702 is illustrated with cross-hatching.

Returning to FIG. 5, a threshold confidence value that varies relative to the proportion of the sizes of the location position uncertainty area and the geo-fence is determined (act 510). Thus, the threshold confidence value varies based on the sizes of the position uncertainty area and the geo-fence. For example, the threshold confidence value increases as the proportion of the size of the geo-fence to the size of the position uncertainty area increases, so the greater the area of the geo-fence is than the position uncertainty area is, the higher the threshold confidence value is.

In one or more embodiments, the threshold confidence value is generated based on the ratio of the size of the geo-fence area (as identified in act 502) to the size of the position uncertainty area (as identified in act 506). For example, a ratio value α can be calculated using the following equation or formula:

$$\alpha = \frac{A_{fence}}{A_{location}} \qquad (2)$$

where $A_{fence}$ refers to the area of the geo-fence, and $A_{location}$ refers to the position uncertainty area for a location of the computing device.

The threshold confidence value can be determined in various manners based on the ratio value α. For example, different ratio values α can be determined for different geo-fence areas and position uncertainty areas. The determined ratio values α and assumed threshold confidence levels can be used to generate a formula that describes the relationship between the determined ratio values α and the assumed threshold confidence levels. The assumed threshold confidence levels can be determined in a variety of different manners, such as empirically by the developer of the system 200.

Table I illustrates an example of assumed threshold confidence levels for different ratio values α. It should be noted that the assumed threshold confidence levels in Table I are examples, and that other values can alternatively be used. In Table I, the confidence level of "not detectable" refers to a geo-fence event not being detectable for the corresponding ratio values α.

TABLE I

| α value | Assumed threshold confidence level |
|---|---|
| 0.0001 | not detectable |
| 0.01 | 1 |
| 0.0625 | 6.25 |
| 0.1 | 10 |
| 0.5 | 20 |
| 1 | 30 |
| 2 | 50 |
| 4 | 66 |
| 5 | 75 |
| 8 | 90 |
| 10 | 100 |
| 100 | 100 |
| 150 | 100 |
| 1000 | 100 |

Given the determined ratio values α and the assumed threshold confidence levels, a formula that describes the relationship between the determined ratio values α and the assumed threshold confidence levels can be generated in any of a variety of different manners. For example, the determined ratio values α and corresponding assumed threshold confidence levels can be plotted on a graph and an approximately best fit line determined, the formula for the determined line being the formula that describes the relationship between the determined ratio values α and the assumed threshold confidence levels.

In one or more embodiments, the formula that describes the relationship between the determined ratio values α and the assumed threshold confidence levels has the following form:

$$C_{threshold} = M\alpha^n \quad (3)$$

where $C_{threshold}$ is the threshold confidence value, M is a coefficient value, and n is an exponent or index value. Various different coefficient values M and exponent values n can be used. For example, the coefficient value M can be 30.704 and the exponent value n can be 0.5371. However, it should be noted that these are example values and that other coefficient and exponent values can alternatively be used.

FIG. 8 illustrates an example table 800 showing an example confidence (e.g., approximately a maximum confidence) that can be achieved given a geo-fence radius (the rows of the table 800) and different location determination modules (the columns of the table 800) in accordance with one or more embodiments. It should be noted that the table 800 is an example of values, and other threshold values, geo-fence sizes, and/or position uncertainty areas can alternatively be used. Each row of the table 800 is for a particular geo-fence that can be enclosed in an approximately circular area and has a radius as identified in the table 800. Examples of the particular geo-fences are also illustrated. Each column of the table 800 is for a particular position uncertainty area that is approximately circular in area and has a radius as identified in the table 800. Examples of location sources (different location determination modules or different techniques for determining locations) for the particular position uncertainty areas are also illustrated.

By way of example, table 800 shows that the confidence value that can be achieved for a geo-fence having a radius of 10 m (and thus an area of $\pi 10^2 = 314.159$ m$^2$) and a location determination module with a position uncertainty area having a radius of 50 m (and thus an area of $\pi 50^2 = 7853.982$ m$^2$) is 5.45. Values in the table 800 of "N/A" indicate that the acceptable confidence value cannot be satisfied by the location determination module for the geo-fence.

Returning to FIG. 5, given the confidence value determined for indicating if the geo-fence has been breached in act 508 and the threshold confidence value determined in act 510, a check is made as to whether the determined confidence value satisfies the threshold confidence value (act 512). The determined confidence value satisfies the threshold confidence value if, for example, the determined confidence value is greater than and/or equal to the threshold confidence value. Alternatively, the determined confidence value and threshold confidence values can be implemented in other manners, such as being negative numbers or subtracted from another base number so that the determined confidence value satisfies the threshold confidence value if the determined confidence value is less than and/or equal to the threshold confidence value.

If the determined confidence value satisfies the threshold confidence value, then the location provided by the location determination module is determined to be inside the geo-fence (act 514). However, if the determined confidence value does not satisfy the threshold confidence value then the location provided by the location determination module will not result in detection of a geo-fence entry event (act 516).

It should be noted that if the determined confidence value does not satisfy the threshold confidence value then other geo-fence events may be detected, such as a geo-fence exit event, an event of staying within a geo-fence for a particular amount of time, and so forth. Alternatively, the location provided by the location determination module may not result in detection of other geo-fence events unless other criteria are satisfied. For example, a geo-fence exit event may not be detected until the determined confidence value is approximately 0% (e.g., there is substantially no overlap between the position uncertainty area for the determined location of the computing device and the geo-fence). By way of another example, an event of staying with a geo-fence may not be detected until a geo-fence enter event for the geo-fence has been detected and at least a threshold amount of time has elapsed without a geo-fence exit event for the geo-fence being detected.

Figure 9:
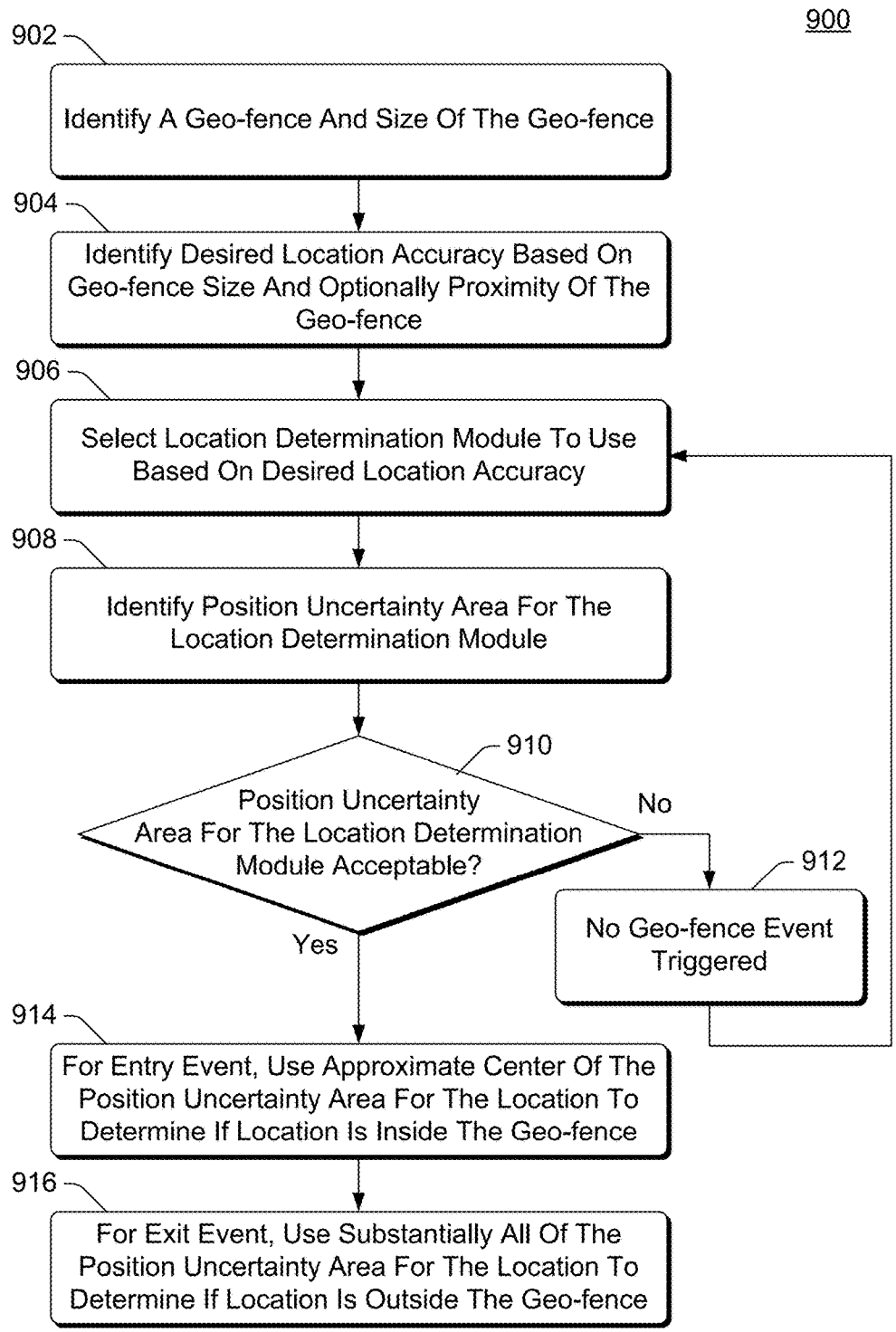
FIG. 9 is a flowchart illustrating another example process for detecting geo-fence events using varying confidence levels in accordance with one or more embodiments.

FIG. 9 is a flowchart illustrating an example process 900 for detecting geo-fence events using varying confidence levels in accordance with one or more embodiments. In the process 900, the confidence level is how much error in accuracy of a location determination module is acceptable for the geo-fence area (and thus how much confidence there is in the determination of whether the computing device is inside or outside the geo-fence). As the size of a geo-fence increases, the amount of error in accuracy of a location determination module that is acceptable can be increased (the acceptable current position uncertainty area can be increased), allowing less accurate location determination modules to be used. As the size of a geo-fence decreases, the amount of error in accuracy of a location determination module that is acceptable can be decreased (the acceptable current position uncertainty area can be decreased), so that more accurate location determination modules are used.

The process 900 is carried out by a system, such as the system 200 of FIG. 2, and can be implemented in software, firmware, hardware, or combinations thereof. The process 900 is shown as a set of acts and is not limited to the order shown for performing the operations of the various acts. The process 900 is an example process for detecting geo-fence events using varying confidence levels; additional discussions of detecting geo-fence events using varying confidence levels are included herein with reference to different figures.

In process 900, a geo-fence and its size are identified (act 902). The identified geo-fence is a geo-fence selected by the geo-fence determination module, and its size can be determined in various manners analogous to the discussion above regarding act 402 of FIG. 4.

Given the size of the geo-fence, a desired location accuracy is identified (act 904). This desired location accuracy can be identified in a variety of different manners, such as a formula, table, and so forth. This desired location accuracy can also be based on the proximity of the geo-fence, as discussed in more detail below. In one or more embodiments, the system 200 is configured with or has access to a desired location accuracy table that indicates the desired location accuracy for different geo-fence sizes. The desired location accuracy table can be populated with desired location accuracies for different geo-fence sizes in various manners, such as empirically by the designer of the system 200.

FIG. 10 illustrates an example table 1000 that indicates the desired location accuracy (e.g., approximately a minimum location accuracy) for different geo-fence sizes in accordance with one or more embodiments. Each row of the table 1000 is for a particular geo-fence that is approximately circular in area and has a radius as identified in the table 1000. A column 1002 of the table 1000 illustrates examples of the particular geo-fences. A column 1004 of the table 1000 illustrates example desired accuracies (e.g., approximately a minimum location accuracy) for the geo-fences. By way of example, table 1000 shows that for a geo-fence with a radius range of 50 m or less, the desired location accuracy is 2 times the geo-fence radius.

The table 1000 illustrates geo-fences that are approximately circular in area and a particular radius, and desired accuracies in terms of radiuses of an approximately circular position uncertainty area of a location. It should be noted that these are examples, and that geo-fences and/or desired accuracies can be identified in other manners for other shapes (e.g., as areas rather than radiuses).

Although specific values are illustrated in the table 1000, it should be noted that other values can alternatively be used. For example, rather than individual values, proportional values may be used. E.g., if the geo-fence radius range is 500 m and the desired accuracy is 500 m, then the desired accuracy for a geo-fence with a radius range of 250 m can be 250 m, the desired accuracy for a geo-fence with a radius range of 125 m can be 125, and so forth.

Returning to FIG. 9, a location determination module to use is selected based on the identified desired location accuracy (act 906). Different location determination techniques can have different associated uncertainty in their accuracies as discussed above, and given the desired location accuracy a location determination module that provides the desired location accuracy can be readily identified (e.g., a location determination module having an associated uncertainty (e.g., error radius) that is less than the desired location accuracy). If a single location determination module provides the desired location accuracy, then that single location determination module is selected in act 906. However, in situations in which multiple location determination modules provide the desired location accuracy, one of those multiple location determination modules is selected. Which of the multiple location determination modules is selected can be determined in different manners, such as the location determination module that consumes the smallest amount of power when operating, the location determination module that provides a location in the shortest amount of time, and so forth.

A position uncertainty area for the location determination module is identified (act 908). The location determination module in act 908 is the location determination module selected in act 906. The position uncertainty area can be identified based on uncertainty of the location determination module determined in various manners as discussed above.

A check is made as to whether the position uncertainty area for the location determination module is acceptable (act 910). Whether the position uncertainty area is acceptable can be determined in a variety of different manners, such as a formula, table, and so forth. In one or more embodiments, the system 200 is configured with or has access to an acceptable uncertainty table that indicates the acceptable uncertainties for different geo-fence sizes. The acceptable uncertainty table can be populated with acceptable uncertainties for different geo-fence sizes in various manners, such as empirically by the designer of the system 200.

In one or more embodiments, the acceptable uncertainty table is included as part of the table 1000 of FIG. 10. Acceptable uncertainties are illustrated as a column 1006 in the table 1000 in terms of radiuses of an approximately circular position uncertainty area of a location. It should be noted that these are examples, and that acceptable errors can be identified in other manners for other shapes (e.g., as areas rather than radiuses).

If the position uncertainty area obtained from the location determination module is not acceptable, then no geo-fence is triggered (act 912). Process 900 may end, or alternatively may return to act 906 to attempt to select a different location determination module to use (e.g., having a higher accuracy than the previously selected location determination module).

However, if the position uncertainty area for the location determination module is acceptable, then the position uncertainty area for the location is used to determine if the location is inside or outside the fence. If the location was previously outside the fence, so the geo-fence event would be entering the geo-fence, then the approximate center of the position uncertainty area is used to determine if the location of the computing device is inside or outside the fence (act 914). If the approximate center of the position uncertainty area is inside the geo-fence then the location is determined to be inside the geo-fence, and if the approximate center of the position uncertainty area is not inside the geo-fence then the location is determined to be outside the geo-fence.

If the location was previously inside the fence, so that the geo-fence event that would be detected would be exiting the geo-fence (or staying in the geo-fence for a particular amount of time), then substantially all of the position uncertainty area is used to determine if the location of the computing device is inside or outside the fence (act 916). If substantially all of the position uncertainty area is outside the geo-fence then the location is determined to be outside the geo-fence, and if substantially all of the position uncertainty area is not outside the geo-fence then the location remains unchanged as being inside the geo-fence.

It should be noted that although act 914 is discussed with reference to the approximate center of the current position uncertainty area being inside the geo-fence and act 916 is discussed with reference to substantially all of the position uncertainty area being outside the geo-fence, different portions of the position uncertainty area can be used. For example, substantially all of the position uncertainty area or only a portion of the position uncertainty area can be used to determine whether the computing device is inside the geo-fence in act 914. By way of another example, the approximate center of the position uncertainty area or another portion of the position uncertainty area can be used to determine whether the computing device is outside the geo-fence in act 916.

It should also be noted that in the table 1000, a column 1004 of desired accuracies for the geo-fences and a column 1006 of acceptable uncertainties is illustrated. The same desired accuracies and acceptable uncertainties can be used for determining both exiting the geo-fence and entering the geo-fence. Alternatively, different desired accuracies and acceptable uncertainties can be used for exiting the geo-fence than are used for entering the geo-fence. For example, the column 1004 can be desired accuracies for the geo-fences when determining entering a geo-fence, and table 1000 can include an additional column of desired accuracies for the geo-fences when determining exiting a geo-fence. The desired accuracies for the geo-fences when determining exiting a geo-fence can be various values, such as two times the values listed in column 1004 (e.g., for determining exiting a geo-fence with a radius range of 35 m or less, the desired accuracy could be 70 m×2=140 m). By way of another example, the column 1006 can be acceptable uncertainties for the geo-fences when determining entering a geo-fence, and table 1000 can include an additional column of acceptable uncertainties for the geo-fences when determining exiting a geo-fence. The acceptable uncertainties for the geo-fences when determining exiting a geo-fence can be various values, such as two times the values listed in column 1006 (e.g., for determining exiting a geo-fence with a radius range of 50 m or less, the acceptable uncertainties could be 150 m×2=300 m).

Figure 11:
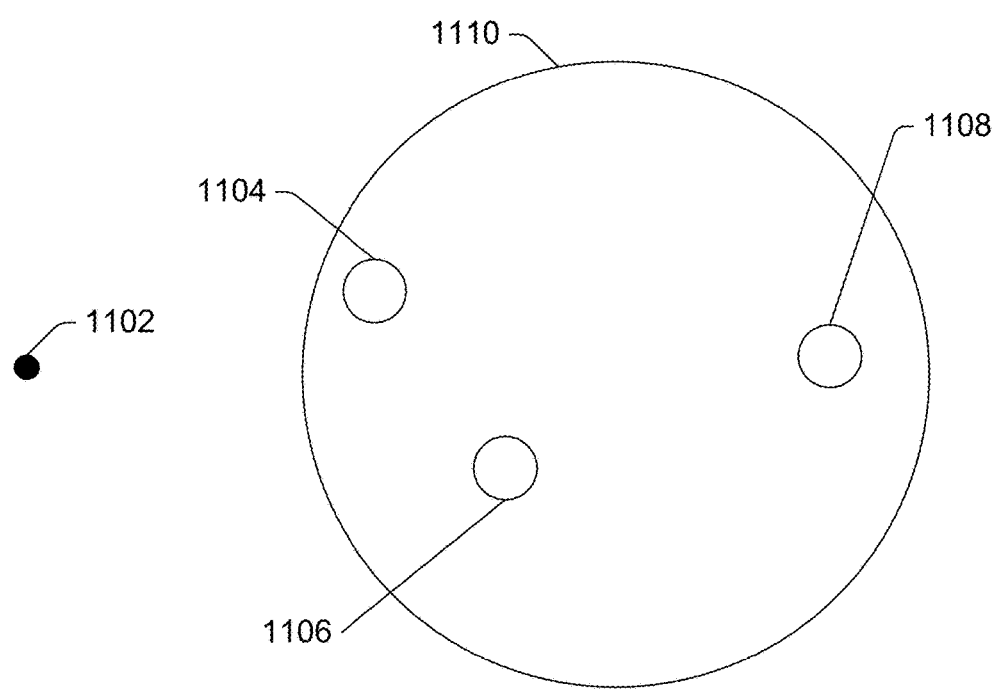
FIG. 11 illustrates multiple overlapping geo-fences in accordance with one or more embodiments.

Referring again to act 904, situations can arise in which multiple different geo-fences are close to the computing device (e.g., are selected by the geo-fence determination module 204 of FIG. 2). In such situations, one of those multiple geo-fences is selected as the geo-fence for which the desired location accuracy is identified in act 904, such as the geo-fence that is the most (or nearly the most) stringent. FIG. 11 illustrates an example of this situation.

FIG. 11 illustrates multiple overlapping geo-fences in accordance with one or more embodiments. A current location 1102 of the computing device is illustrated, and a set of geo-fences 1104, 1106, 1108, and 1110 are selected by the geo-fence determination module 204 of FIG. 2. The geo-fence 1110 is closest to the current location 1102 but also has the largest desired location accuracy of the geo-fences 1104-1110. The geo-fence 1110 could be selected as the geo-fence for which the desired location accuracy is identified in act 904. Alternatively, rather than selecting the geo-fence 1110 as the geo-fence for which the desired location accuracy is identified in act 904, one of the geo-fences 1104-1108 is selected.

Returning to FIG. 9, which geo-fence is determined to be the most (or nearly the most) stringent is determined based on the set of multiple geo-fences and a set of acceptable error radiuses. For example, the geo-fence that is determined to be the most (or nearly the most) stringent can be determined by determining which of the multiple geo-fences has the smallest value for the following equation:

$$((\text{distance}(G_i) + A_i) - \text{distance}(G_0);\ 0 \le i \le n$$

where "distance( )" refers to the distance between the current location of the computing device and the closest edge of the geo-fence in parentheses, $G_i$ is a geo-fence in a set of geo-fences $\{G_0, G_1, \ldots, G_n\}$ in distance order from the edge of the largest geo-fence with $G_0$ being the closest geo-fence to the approximate center of the current location (e.g., geo-fence 1104 of FIG. 11), and $A_i$ is an acceptable error radius for the geo-fence $A_i$ as indicated in the table 1000 of FIG. 10.

This determination of which geo-fence is most (or nearly most) stringent is based on geo-fences that are approximately circular in area and have particular radiuses. It should be noted that these are examples, and that geo-fences can be identified in other manners for other shapes (e.g., as areas rather than radiuses).

Alternatively, rather than selecting one geo-fence for which the desired location accuracy is identified in act 904, the desired location accuracies for multiple geo-fences can be combined to identify the desired location accuracy in act 904. This combination can be a weighting of a set of closest geo-fences, such as geo-fences $\{G_0, G_1, \ldots, G_n\}$ each having its desired location accuracy weighted based on how close the geo-fence is to the current location of the computing device (e.g., with geo-fences closer to the current location of the computing device being weighted higher than geo-fences further from the current location of the computing device). The weighted desired location accuracies can then be combined (e.g., added together) to generate the desired location accuracy for act 904.

Although particular functionality is discussed herein with reference to particular modules, it should be noted that the functionality of individual modules discussed herein can be separated into multiple modules, and/or at least some functionality of multiple modules can be combined into a single module. Furthermore, it should be noted that a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 12:
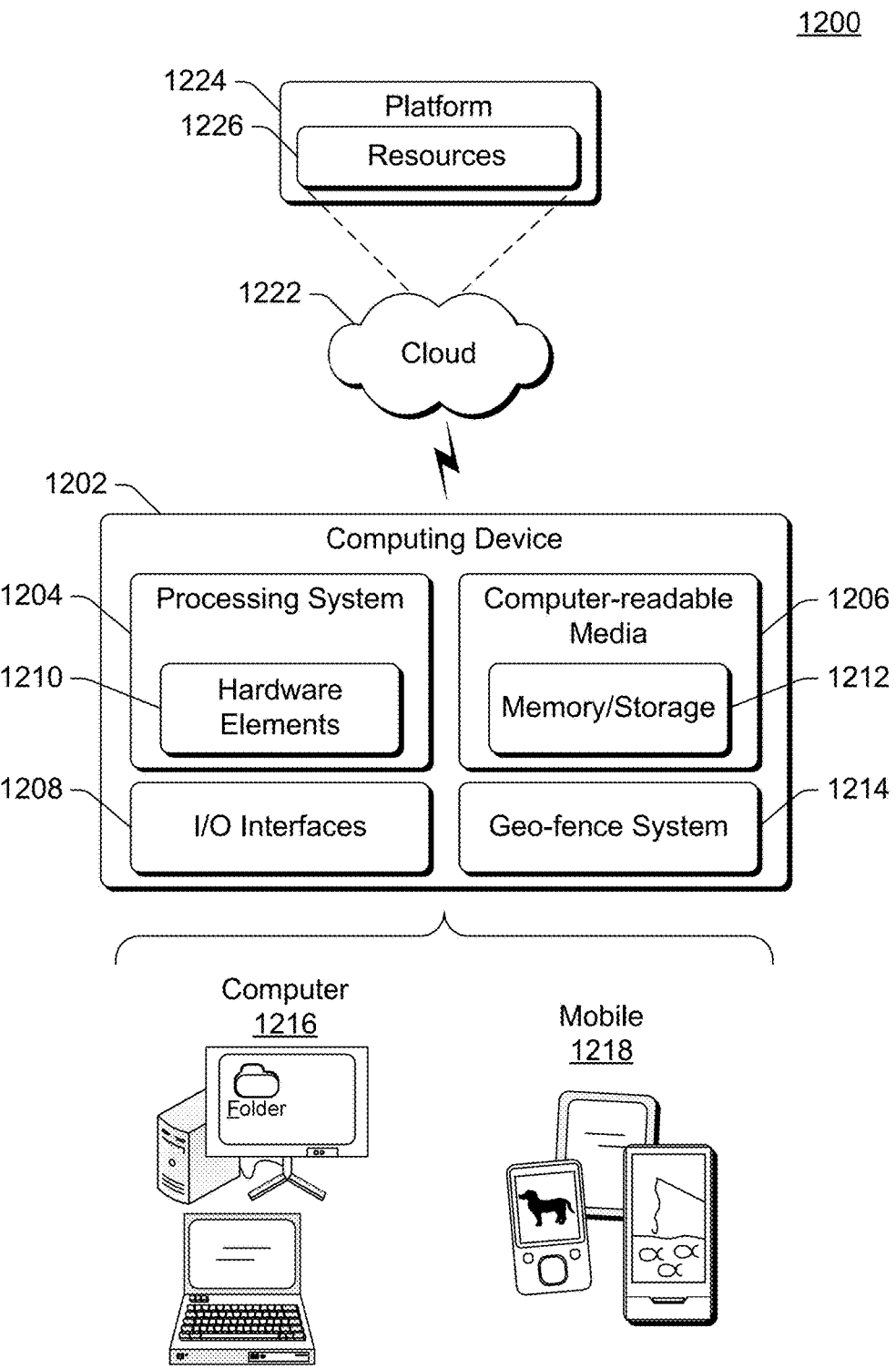
FIG. 12 illustrates an example system that includes an example computing device that is representative of one or more systems and/or devices that may implement the various techniques described herein.

FIG. 12 illustrates an example system generally at 1200 that includes an example computing device 1202 that is representative of one or more systems and/or devices that may implement the various techniques described herein. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O Interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage 1212 may include volatile media (such as random access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Computing device 1202 also includes a geo-fence system 1214. Geo-fence system 1214 provides various geo-fence functionality, including detecting geo-fence events using varying confidence levels, as discussed above. Geo-fence system 1214 can implement, for example, the system 200 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of modules as a module that is executable by the computing device 1202 as software may be achieved at least partially in hardware, e.g., through use of computer-readable storage media and/or hardware elements 1210 of the processing system. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a mobile device, and/or other devices. Services and applications run substantially similar in these environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1216 or mobile 1218 uses. Each of these configurations includes devices that may have generally different constructs and capabilities, and thus the computing device 1202 may be configured according to one or more of the different device classes. For instance, the computing device 1202 may be implemented as the computer 1216 class of a device that includes a personal computer, desktop computer, a multi-screen computer, laptop computer, netbook, and so on. The computing device 1202 may also be implemented as the mobile 1218 class of device that includes mobile devices, such as a mobile phone, portable music player, portable gaming device, a tablet computer, a wearable device, a multi-screen computer, and so on.

The techniques described herein may be supported by these various configurations of the computing device 1202 and are not limited to the specific examples of the techniques described herein. This functionality may also be implemented all or in part through use of a distributed system, such as over a "cloud" 1222 via a platform 1224 as described below.

The cloud 1222 includes and/or is representative of a platform 1224 for resources 1226. The platform 1224 abstracts underlying functionality of hardware (e.g., servers) and software resources of the cloud 1222. The resources 1226 may include applications and/or data that can be utilized while computer processing is executed on servers that are remote from the computing device 1202. Resources 1226 can also include services provided over the Internet and/or through a subscriber network, such as a cellular or Wi-Fi network.

The platform 1224 may abstract resources and functions to connect the computing device 1202 with other computing devices. The platform 1224 may also serve to abstract scaling of resources to provide a corresponding level of scale to encountered demand for the resources 1226 that are implemented via the platform 1224. Accordingly, in an interconnected device embodiment, implementation of functionality described herein may be distributed throughout the system 1200. For example, the functionality may be implemented in part on the computing device 1202 as well as via the platform 1224 that abstracts the functionality of the cloud 1222.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   identifying, by a computing device, a size of a geo-fence, the size of the geo-fence comprising an area encompassed by the geo-fence;
   selecting, based on the size of the geo-fence, a location determination module from multiple location determination modules;
   identifying, by the computing device, a size of a position uncertainty area for the location determination module, the position uncertainty area being based on an estimated accuracy error of a location for the computing device provided by the location determination module and being specific to the location determination module; and
   determining, by the computing device, occurrence of one or more geo-fence events for the geo-fence based on a confidence value for a geo-fence breach condition satisfying a threshold confidence value, the threshold confidence value varying based at least in part on a ratio of the size of the geo-fence and the size of the position uncertainty area.

2. A method as recited in claim 1, further comprising determining that the computing device is inside the geo-fence in response to the confidence value for the geo-fence breach condition satisfying the threshold confidence value.

3. A method as recited in claim 1, further comprising generating the confidence value for the geo-fence breach condition using an area of overlap between a position uncertainty area for the location of the computing device and the geo-fence.

4. A method as recited in claim 1, further comprising selecting as the location determination module, one of multiple location determination modules that can provide a position with a position uncertainty area that will provide an acceptable confidence level given the size of the geo-fence.

5. A method as recited in claim 1, the threshold confidence value comprising how much error in accuracy of the location determination module is acceptable for the size of the geo-fence, and the determining comprising selecting one of multiple location determination modules that provides at least an acceptable position uncertainty area given the size of the geo-fence.

6. A method as recited in claim 4, further comprising:
   using a first acceptable position uncertainty area given the size of the geo-fence in response to the computing device being inside the geo-fence; and
   using a second acceptable position uncertainty area given the size of the geo-fence in response to the computing device being outside the geo-fence.

7. A method as recited in claim 1, the determining comprising determining, as the occurrence of one or more geo-fence events the computing device entering the geo-fence.

8. A method as recited in claim 1, the determining comprising determining, as the occurrence of one or more geo-fence events, the computing device exiting the geo-fence.

9. A computing device comprising:
   a data store configured to store geo-fence data for multiple geo-fences, the geo-fence data for each geo-fence identifying an area of the geo-fence;
   one or more location determination modules implemented at least in part in hardware each configured to provide a location of the computing device, the location of the computing device having an associated position uncertainty area; and
   a geo-fence event detection module implemented at least in part in hardware to detect occurrence of one or more geo-fence events for at least one of the multiple geo-fences based on a confidence level that varies based at least in part on a ratio of a size of at least one of the multiple geo-fences, the size of the geo-fence being an area encompassed by the geo-fence, and a size of the position uncertainty area associated with a location determination module selected based on the size of the geo-fence.

10. A computing device as recited in claim 9, the confidence level that varies being used by the geo-fence event detection module to detect one or more breach conditions of one or more geo-fences, and one of multiple location determination modules being selected based on an ability of the one location determination module to provide a location with at least an acceptable position uncertainty area given the size of at least one of the multiple geo-fences.

11. A computing device as recited in claim 10, the geo-fence event detection module being further configured to:
  use one acceptable uncertainty given the size of the at least one of the multiple geo-fences in response to the computing device being inside the geo-fence; and
  use a different acceptable uncertainty given the size of the at least one of the multiple geo-fences in response to the computing device being outside the geo-fence.

12. A computing device as recited in claim 9, the confidence level being determined and compared to a threshold confidence level to detect a geo-fence breach condition of a geo-fence, where:
  the threshold confidence value varies relative to the size of the geo-fence and a current position uncertainty area; and
  the confidence value for a current location is compared with the threshold confidence level to determine if the geo-fence breach condition has been met.

13. A computing device as recited in claim 12, wherein the geo-fence event detection module is further configured to:
  generate the threshold confidence value using a formula based on the size of the geo-fence area and the size of the position uncertainty area; and
  determine that the computing device is inside the geo-fence in response to the confidence value for the current location satisfying the threshold confidence value.

14. A computing device as recited in claim 12, wherein the geo-fence event detection module is further configured to generate the threshold confidence value to detect the geo-fence breach condition using an area of overlap between a position uncertainty area for the current location of the computing device and the geo-fence.

15. A computing device as recited in claim 12, wherein the geo-fence event detection module is further configured to select, as the location determination module, one of multiple location determination modules that can provide a location with an uncertainty area that will provide an acceptable confidence level to detect the geo-fence breach condition given the size of the geo-fence.

16. A computing device as recited in claim 9, wherein to detect the occurrence of the one or more geo-fence events is to detect the computing device entering the geo-fence.

17. A computing device as recited in claim 9, wherein to detect the occurrence of the one or more geo-fence events is to detect the computing device exiting the geo-fence.

18. A method comprising:
  identifying a size of a geo-fence, the size of the geo-fence comprising an area encompassed by the geo-fence;
  selecting, based on the size of the geo-fence, one of multiple location determination modules to use;
  identifying a size of a position uncertainty area for the selected location determination module, the position uncertainty area being based on an amount of uncertainty in the accuracy of a location for a computing device provided by the location determination module;
  determining a confidence value that a geo-fence has been breached using the position uncertainty area as well as an area of overlap between the position uncertainty area and the geo-fence;
  determining a threshold confidence value to indicate a geo-fence breach condition using a formula based on a ratio of the size of the geo-fence area and the size of the position uncertainty area of a current location of the computing device; and
  determining that the computing device is inside the geo-fence when the confidence value satisfies the threshold confidence value, otherwise determining that the computing device may not be inside the geo-fence.

19. A method as recited in claim 1, the threshold confidence value increasing as the ratio of the size of the geo-fence and the size of the position uncertainty area increases.

20. A method as recited in claim 3, further comprising generating as the confidence value for the geo-fence breach condition a value that is the area of overlap between the position uncertainty area for the location of the computing device and the geo-fence divided by the position uncertainty area for the location of the computing device and the geo-fence.

* * * * *